United States Patent
Sumner, II et al.

(10) Patent No.: US 8,096,811 B2
(45) Date of Patent: Jan. 17, 2012

(54) COMPUTER ARCHITECTURE AND PROCESS OF USER EVALUATION

(75) Inventors: Walton Sumner, II, Webster Groves, MO (US); Jinzhong Xu, Lexington, KY (US); Guy H. Roussel, Lexington, KY (US); Richard J. Rovinelli, Lexington, KY (US); Michael D. Hagen, Lexington, KY (US)

(73) Assignee: American Board of Family Medicine, Inc., Lexington, KY (US)

( * ) Notice: Subject to any disclaimer, the term of this patent is extended or adjusted under 35 U.S.C. 154(b) by 1073 days.

(21) Appl. No.: 10/998,384

(22) Filed: Nov. 29, 2004

(65) Prior Publication Data

US 2005/0118557 A1    Jun. 2, 2005

Related U.S. Application Data

(60) Provisional application No. 60/525,641, filed on Nov. 29, 2003.

(51) Int. Cl.
*G09B 23/28* (2006.01)
*G09B 7/00* (2006.01)

(52) U.S. Cl. .......................... 434/262; 434/362; 706/15
(58) Field of Classification Search .................. 434/262, 434/362; 706/15, 924
See application file for complete search history.

(56) References Cited

U.S. PATENT DOCUMENTS

| | | | | |
|---|---|---|---|---|
| 4,622,013 A | * | 11/1986 | Cerchio | 434/118 |
| 4,945,476 A | * | 7/1990 | Bodick et al. | 600/301 |
| 4,970,657 A | * | 11/1990 | Wolf | 706/52 |
| 5,385,474 A | * | 1/1995 | Brindle | 434/267 |
| 5,594,638 A | * | 1/1997 | Iliff | 705/3 |
| 5,660,176 A | * | 8/1997 | Iliff | 600/300 |
| 5,680,590 A | * | 10/1997 | Parti | 703/2 |
| 5,704,791 A | | 1/1998 | Gillio | |
| 5,769,640 A | * | 6/1998 | Jacobus et al. | 434/262 |
| 5,774,632 A | * | 6/1998 | Kaske | 706/25 |
| 5,791,907 A | * | 8/1998 | Ramshaw et al. | 434/262 |
| 5,800,177 A | | 9/1998 | Gillio | |
| 5,800,178 A | | 9/1998 | Gillio | |
| 5,805,160 A | * | 9/1998 | Yoshida et al. | 714/25 |
| 5,827,070 A | | 10/1998 | Kershaw et al. | |
| 5,835,897 A | * | 11/1998 | Dang | 705/2 |

(Continued)

OTHER PUBLICATIONS

SNOMED CT—Wikipedia, the free Encyclopedia. [retrieved Jul. 30, 2009 from Wikipedia] <en.wikipedia.org/wiki/SNOMED_CT>.*

(Continued)

*Primary Examiner* — Nikolai A Gishnock
(74) *Attorney, Agent, or Firm* — James C. Eaves, Jr.; Brian W. Chellgren; Greenebaum Doll & McDonald PLLC

(57) ABSTRACT

The present invention is generally related to a computer architecture and process for evaluating and reporting on a user's competence in managing a simulation of a complex system modeled in a computer based testing and training system. The simulation may be called a "virtual system." The method generates evaluation criteria responsive to a user profile, user choices in managing the virtual system, and events that occur during a simulation, in addition to the original state of the system. The method produces summary evaluations responsive to a plurality of characteristics of the simulated system. The implementation may be advantageously employed to evaluate a medical clinician's management of computer-simulated human patients, hereinafter called "virtual patients". The present invention is also suitable for evaluation of user management of a plurality of complex systems including but not limited to animals, plants, cells, machines, and populations.

14 Claims, 11 Drawing Sheets

U.S. PATENT DOCUMENTS

| | | | |
|---|---|---|---|
| 5,882,206 A | 3/1999 | Gillio | |
| 6,074,213 A * | 6/2000 | Hon | 434/262 |
| 6,077,082 A * | 6/2000 | Gibson et al. | 434/262 |
| 6,233,539 B1 * | 5/2001 | Brown | 703/11 |
| 6,234,806 B1 | 5/2001 | Trenholm et al. | |
| 6,246,975 B1 | 6/2001 | Rivonelli et al. | |
| 6,272,468 B1 * | 8/2001 | Melrose | 705/2 |
| 6,438,533 B1 * | 8/2002 | Spackman et al. | 706/45 |
| 6,687,685 B1 * | 2/2004 | Sadeghi et al. | 706/15 |
| 6,692,258 B1 * | 2/2004 | Kurzweil et al. | 434/262 |
| 6,747,672 B1 * | 6/2004 | Haakonsen et al. | 715/700 |
| 7,024,399 B2 * | 4/2006 | Sumner et al. | 706/45 |
| 7,371,067 B2 * | 5/2008 | Anderson et al. | 434/262 |
| 7,386,432 B1 * | 6/2008 | Haakonsen et al. | 703/11 |
| 7,395,248 B2 * | 7/2008 | Kates et al. | 706/12 |
| 7,404,715 B2 * | 7/2008 | Maier | 434/262 |
| 7,428,494 B2 * | 9/2008 | Hasan et al. | 705/3 |
| 7,734,480 B2 * | 6/2010 | Stangel | 705/3 |
| 7,862,340 B2 * | 1/2011 | Chen et al. | 434/268 |
| 2001/0001852 A1 | 5/2001 | Rovinelli et al. | 703/22 |
| 2001/0041992 A1 * | 11/2001 | Lewis et al. | 705/3 |
| 2002/0127525 A1 * | 9/2002 | Arington et al. | 434/262 |
| 2002/0137014 A1 * | 9/2002 | Anderson et al. | 434/262 |
| 2002/0168618 A1 * | 11/2002 | Anderson et al. | 434/262 |
| 2003/0068608 A1 * | 4/2003 | Kuth et al. | 434/262 |
| 2003/0130973 A1 * | 7/2003 | Sumner et al. | 706/45 |
| 2003/0165802 A1 * | 9/2003 | Murphy | 434/350 |
| 2004/0009459 A1 * | 1/2004 | Anderson et al. | 434/262 |
| 2004/0015810 A1 * | 1/2004 | Swinney | 717/100 |
| 2004/0064298 A1 * | 4/2004 | Levine | 703/11 |
| 2004/0152056 A1 * | 8/2004 | Lamb et al. | 434/219 |

OTHER PUBLICATIONS

Hagen, MD et al. Computer-based Testing in Family Practice Certification and Recertification. Journal of the American Board of Family Practice, Computer-based Testing; vol. 16, No. 3, May-Jun. 2003, pp. 227-232.*

Sumner W., Hagen M. D., Rovinelli, R., The Item Generation Methodology of an Empiric Simulation Project, Advances in Health Sciences Education, 1999, p. 27-38, 4(1).

Downs et al., Scoring Performance on Computer-Based Patient Simulations: Beyond Value of Information, Proceedings of the AMIA Annual Fall Symposium, 1999, p. 520-4.

Downs et al., A Decision Analytic Method for Scoring Performance on Computer-Based Patient Simulations, Proceedings of the AMIA Annual Fall Symposium, 1997, p. 667-71.

International Search Report, Form PCT/ISA/210, 5 pages, for International Application No. PCT/US04/39891 completed on Apr. 24, 2008 and mailed May 15, 2008.

* cited by examiner

FIG. 4A

| SIMULATOR EVENT | KNOWLEDGE BASE OBJECT | CHECKLIST GENERATOR (CG) PROCESSING |
|---|---|---|
| SIMULATION STARTS | VIRTUAL PATIENT → MASTER PLAN (A) | RUN (A) CG INFERENCE PROGRAM; CREATE, TIME STAMP (A) CRITERIA; LINK (A) CRITERIA TO PATIENT.<br><br>PRESENT INTERACTIVE (A) CRITERIA; SAVE STATUS. |
| HEALTH STATE BEGINS | HEALTH STATE → MASTER PLAN (B) | RUN (B) CG INFERENCE PROGRAM; CREATE, TIME STAMP (B) CRITERIA; LINK (B) CRITERIA TO PATIENT.<br><br>PRESENT INTERACTIVE (B) CRITERIA; SAVE STATUS. |
| (USER ACTIONS) INTERVENTION BEGUN OR QUERY POSED OR ANSWER RECEIVED | INTERVENTION → MASTER PLAN (C) OR QUERY→MASTER PLAN (C) OR QUERY→RESULT→MASTER PLAN (C) | RUN (C) CG INFERENCE PROGRAM; CREATE, TIME STAMP (C) CRITERIA; LINK (C) CRITERIA TO PATIENT.<br><br>PRESENT INTERACTIVE (C) CRITERIA; SAVE STATUS.<br><br>UPDATE STATUS OF (A), (B), AND EARLIER (C) CRITERIA. |
| HEALTH STATE ENDS | MASTER PLAN (B) | CALL CHECKLIST REPORTING METHOD TO WRITE (B) CRITERIA REPORT |
| INTERVENTION ENDS QUERY FOLLOW UP TIME LIMIT EXPIRES | MASTER PLAN (C) | CALL CHECKLIST REPORTING METHOD TO WRITE (C) CRITERIA REPORT |
| SIMULATION ENDS | VIRTUAL PATIENT → MASTER PLAN (A) | CALL CHECKLIST REPORTING METHOD TO WRITE (A) CRITERIA REPORT |

FIG. 4B

| SIMULATOR EVENT | KNOWLEDGE BASE OBJECT | EVALUATOR PROCESSING |
|---|---|---|
| SIMULATION STARTS | VIRTUAL PATIENT → MASTER PLAN (A) | LINK (A) EVALUATOR TO PATIENT; TIME STAMP (A) EVALUATOR. |
| HEALTH STATE BEGINS | HEALTH STATE → MASTER PLAN (B) | LINK (B) EVALUATOR TO PATIENT; TIME STAMP (B) EVALUATOR. |
| (USER ACTIONS) INTERVENTION BEGUN OR QUERY POSED OR ANSWER RECEIVED | INTERVENTION → MASTER PLAN (C) OR QUERY→MASTER PLAN (C) OR QUERY→RESULT→MASTER PLAN (C) | LINK (C) EVALUATOR TO PATIENT; TIME STAMP (C) EVALUATOR. |
| HEALTH STATE ENDS | MASTER PLAN (B) | RUN (B) EVALUATOR PROGRAM; PRESENT INTERACTIVE (B) CRITERIA; WRITE (B) EVALUATOR REPORT. |
| INTERVENTION ENDS QUERY FOLLOW UPTIME LIMIT EXPIRES | MASTER PLAN (C) | RUN (C) EVALUATOR PROGRAM; PRESENT INTERACTIVE (C) CRITERIA; WRITE (C) EVALUATOR REPORT. |
| SIMULATION ENDS | VIRTUAL PATIENT → MASTER PLAN (A) | RUN (A) EVALUATOR PROGRAM; PRESENT INTERACTIVE (A) CRITERIA; WRITE (A) EVALUATOR REPORT. |

FIG. 5

EXAMINEE: JOHN DOE
STATUS: FAILED
EXPLANATION:
TABLE 1 SUMMARIZES ACTIONS RELEVANT TO THE ONSET OF DIABETES MELLITUS STAGE 1.1 AT AGE 66.23

DIABETES MANAGEMENT SCORING CRITERIA EVALUATE ATTENTION TO GLUCOSE CONTROL, SLOWING THE PROGRESSION OF END-ORGAN DAMAGE, MANAGING EXISTING END ORGAN DAMAGE, AND AVOIDANCE OF COMMON IATROGENIC COMPLICATIONS.

| TABLE 1 DIABETES MELLITUS TYPE 2 BASIC MANAGEMENT STATUS REPORT AT AGE 71.223 (END OF SIMULATION) | | |
|---|---|---|
| | DESIRABLE ACTIONS | UNDESIRABLE ACTIONS |
| ACTIONS TAKEN | THESE OCCURED ON SCHEDULE:<br>1. AVERAGE GLUCOSE MEASURE WITHIN 6 MONTHS.<br>2. OPHTHALMOLOGIC REFERRAL WITHIN 1 YEAR.<br>3. A RENAL FUNCTION CHECK WITHIN 90 DAYS.<br>4. INSULIN AND/OR ORAL GLUCOSE-LOWERING AGENTS BEGUN WITHIN 6 MONTHS. | *NO UNDESIRABLE ACTIONS OCCURRED.* |
| ACTIONS NOT TAKEN | *THESE DESIRABLE ACTIONS DID NOT OCCUR*<br>*1. LIPID SCREENING TEST WITHIN 6 MONTHS.* | THESE UNDESIRABLE ACTIONS WERE AVOIDED:<br>1. NSAID PRESCRIPTIONS AVOIDED OVER 5 YEARS. |

FIG. 10

| DESCRIPTION | ILLUSTRATION | MIRROR | ILLUSTRATION | DEFAULT VALUE |
|---|---|---|---|---|
| BEFORE | | AFTER | | SEPARATION |
| MEETS | | MET BY | | FIRST PART LENGTH |
| OVERLAPS | | OVERLAPPED BY | | LENGTH OF OVERLAP |
| ENDS WITH | | STARTS WITH | | LENGTH OF OVERLAP |
| ENCLOSES | | WITHIN | | LENGTH OF OVERLAP |
| STARTS | | ENDS | | LENGTH OF OVERLAP |
| EQUALS | | | | |

FIRST PERIOD ▬ SECOND PERIOD ▭

TIME POINT NAMES: A  B  C  D

VALUE DEFINITIONS:
SEPARATION = MAXIMUM(0, C-B, A-D)
LENGTH OF FIRST PART = MINIMUM(B,D) − MINIMUM(A,C)
LENGTH OF OVERLAP = MINIMUM(B,D) − MAXIMUM(A,C)

COMPUTER ARCHITECTURE AND PROCESS OF USER EVALUATION

This application claims the benefit of U.S. provisional patent application No. 60/525,641, filed 29 Nov. 2003 for computer architecture and process of user evaluation.

FIELD OF THE INVENTION/TECHNICAL FIELD

The present invention is generally related to a computer architecture and process for evaluating and reporting on a user's competence in managing a simulation of a complex system modeled in a computer based testing and training system. The simulation may be called a "virtual system." The method generates evaluation criteria responsive to a user profile, user choices in managing the virtual system, and events that occur during a simulation, in addition to the original state of the system. The method produces summary evaluations responsive to a plurality of characteristics of the simulated system. The implementation may be advantageously employed to evaluate a medical clinician's management of computer-simulated human patients, hereinafter called "virtual patients". The present invention is also suitable for evaluation of user management of a plurality of complex systems including but not limited to animals, plants, cells, machines, and populations.

BACKGROUND OF THE INVENTION

The majority of prior art evaluation systems rely on a few techniques. Item response theory is the predominant interpretation strategy in the prior art. Item response theory guides the interpretation of multiple-choice tests, in which a test comprises a list of items to be selected by a respondent, and wherein items often comprise a stem, a best response, and a list of distracting responses. Items typically have variable difficulty, inversely related to the proportion of respondents who select the best response. A distracting response may be said to confer a degree of difficulty related to the proportion of respondents who select it instead of the best response. Experience using an item defines its degree of difficulty, and the difficulty posed by each distracting response.

Experience with multiple items also establishes a correlation, if any, between respondents' choices on different items. Accordingly, the response selected to simple or difficult items may be used to predict responses to items of intermediate difficulty. An adaptive test may take advantage of this knowledge. A respondent who selects the best response to the most difficult items is likely to score well on items of intermediate and low difficulty. The test administrator may classify a very competent or very incompetent respondent simply by inspecting answers to a few difficult or simple items. The respondent may conclude the test very quickly, without completing a large number of intermediate difficulty items based on the responses given to the difficult or simple items. This computer adaptive testing process does not adapt the test to likely respondent weaknesses, new knowledge, or to content that is relevant given earlier choices.

Variations on the multiple-choice theme include True/False questions, items with multiple acceptable responses, and clinical set problems. A clinical set problem presents clinical information in one or more blocks. A cluster of questions, typically True/False questions about appropriate testing and treatment strategies, follows each block of information. Later blocks of information must be carefully designed such that they do not compromise the items in earlier blocks of information. For instance, if an early block of information precedes an item asking whether to obtain an x-ray, a subsequent block disclosing the results of an x-ray implies that it should be ordered. These do not show that the respondent knows what to ask, how to interpret answers, or how to react to problems.

An alternative embodiment of the clinical set problem presents a block of information on paper or computer, and then allows the user to select questions and view answers using a highlighting pen on paper or a computer display. The user may have many options, and can demonstrate the ability to select questions, interpret answers, and recommend treatments during a single clinical encounter. However, paper and static computer cases generally cannot anticipate the progress of the virtual patient through subsequent visits. A programmer can create a static computer case that is grossly responsive to likely interventions, but such cases are tightly constrained by their fixed program. For instance, a static program can not simulate the consequences of the time and dose of medication in detail.

An alternative prior art evaluation process, commonly used in medical fields, requires an assessor to monitor a clinician's behavior with a checklist. In an exemplary implementation, the assessor is a human actor with or without a real medical problem, who portrays a medical problem (or a plurality thereof) to the respondent. This actor is called a standardized patient. Typically, the test sponsor trains the standardized patient both to portray a medical problem and to observe respondent's behavior. The standardized patient notes the presence or absence of each monitored behavior of a respondent. For instance, the standardized patient may check that a respondent introduced himself by name, and that the respondent ignored a direct question. Limited quantitative reporting is possible.

The checklist used in this evaluation method is necessarily fixed for several reasons. First, standardized patients must be thoroughly familiar with their checklists in order to properly evaluate respondents. These lists are often long, and adding multiple versions and variations would complicate training. Second, a comparison between respondents is a typical analysis that is undertaken to evaluate a training program, or to convince a respondent that the evaluation of his performance is normal or unusual. Standardization is required to ensure comparability. Third, standardized patients would typically be ill-equipped or unable to dynamically and objectively modify their checklists in response to respondents' decisions.

In other implementations, a third party observer may use a checklist to describe a physician's actions. The observer is typically trained to look for specific behaviors during the physician-patient interaction. A third party may observe directly, through a two-way mirror, or may analyze a written, audio, or audiovisual record of the encounter. In a third party observation, less constrained data entry is typical, such as recording of numeric data or subjective impressions.

A further common evaluation process is the oral examination of a respondent by an expert examiner. An oral examination is a cycle in which the examiner provides a block of information with implied or explicit questions. The respondent answers, and then the examiner provides more information and questions. The examiner may have a script, but may also improvise content and questions at any time. The examiner typically judges the responses—or the respondent—to determine whether the respondent passes. This method suffers from the disadvantage that oral examinations are notoriously difficult to standardize, and could easily be influenced by examiner biases.

Evaluation of free text, drawings, and similarly rich response content by an expert also suffers from subjective inconsistencies, as documented by Trenholm, et al. in U.S. Pat. No. 6,234,806, "System and method for interactive scoring of standardized test responses," incorporated herein by reference. Trenholm describes a system whereby a test analyst, analogous to an expert examiner, may interactively modify the grading rules for various features of a response. In this system, expert examiners work with and constantly update a database intended to support more consistent scoring. The expert modifies the database after the respondent completes the test. The respondent has no direct interaction with the database. A response may be automatically re-evaluated when the database criteria change.

Another prior art evaluation process requires assessment of actual processes and outcomes. In the case of clinical medicine skills assessment, outcomes may include longevity; markers that correlate with longevity, such as blood pressure; perceived health; functional status, such as the ability to walk a given distance; resource consumption, such as length of hospitalization; and productivity measures, among others. A process assessment would typically determine whether queries and interventions were done, with the expectation that these queries and interventions lead to improved outcomes.

Yet another evaluation process attempts to evaluate the value of information that a user collects during a patient simulation, based on decision theoretic principles (Downs S M, Friedman C P, Marasigan F, Gartner G, A decision analytic method for scoring performance on computer-based patient simulations, Proceedings of the AMIA Annual Fall Symposium 1997: 667-71, incorporated herein by reference, and Downs S M, Marasigan F, Abraham V, Wildemuth B, Friedman C P, Scoring performance on computer-based patient simulations: beyond value of information. Proceedings of the AMIA Annual Fall Symposium 1999: 520-4, incorporated herein by reference). The decision analytic scoring mechanisms described thus far, while novel and appealing, have several limitations. First, published methods describe a single simulated patient encounter, not a series of encounters.

Second, published methods penalize a user for gathering data with value for managing disease rather than making a diagnosis. Third, published methods do not address correct interpretation of Query responses. Fourth, published methods do not address selection of Interventions. Fifth, published VOI algorithms do not attempt to tabulate the contribution of a Query to several relevant problems in a multi-problem system. Finally, even this simplified form is very complex. Methods that are either simpler or more complex are required for many applications.

The prior art includes physical simulation devices. U.S. Pat. Nos. 5,704,791; 5,800,177; 5,800,178; and 5,882,206, all by Gillio, et al, incorporated herein by reference, teach processes for evaluating a user's skill in executing a given procedure using a physical surgical simulation device. Furthermore, Gillio anticipates combination of the system with other systems, including systems that dynamically modify the physical simulation and user performance criteria. A virtual patient program comprises one such other system. However, the range of options available in managing a virtual patient could require an extensive array of physical simulators. For instance, if management options include a needle biopsy option, a laparascopic option, and an open surgery option, then each examinee could require access to three physical simulators. Therefore, an evaluation process would benefit from processes that allow the user to view and critique Interventions, rather than perform them.

The prior art further includes evaluation by peers. Peer evaluation comprises recorded descriptions of an individual's skill, made by professional colleagues. In the field of medicine, physicians and nurses are now called upon to critique the skills and professional behavior of physicians certified by the American Board of Internal Medicine. Such a peer evaluation process is not easily standardized. It necessarily requires large numbers of evaluations or wide confidence intervals, meaning low thresholds for passing.

All of the foregoing evaluation processes have significant limitations. Although relatively inexpensive to devise and administer, multiple choice questions are very unlike the tasks that clinicians—or any other experts—actually perform. Checklist assessments can efficiently evaluate performance at a single encounter or in retrospect when respondents share a common experience. However, traditional checklists do not dynamically adjust to evolving situations. Oral examinations may adjust to evolving situations, but standardization is typically compromised and potentially forfeited. Actual outcome and process measures have many desirable features, but the collection of outcome measures is very time consuming and expensive, and does not efficiently convey or reinforce knowledge regarding effective clinical practice, especially for a series of steps in a guideline. Furthermore, it is difficult to use actual measures to assess knowledge of rare events, such as unusual complications or combinations of problems.

New methods for simulating complex systems and theoretical frameworks for evaluating complex systems also demonstrate a need for new evaluation methods. U.S. Pat. No. 6,246,975, Rovinelli et al., incorporated herein by reference, and recent literature (Sumner W., Hagen M D, Rovinelli R. The item generation methodology of an empiric simulation project, Advances in Health Sciences Education 1999; 4(1): 25-35), also incorporated herein by reference, demonstrate new methods for simulating a complex system. A medical simulation may produce a virtual patient with a plurality of Health States. Each Health State may evolve independently of the others, while the presence of other Health States may influence the rate of progression of a Health State. One feature of this design is a structure called a Parallel Network comprising a series of Health States representing stages of a disease. The simulation program creates a patient based on any combination of Parallel Networks, with the presenting health state in each Parallel Network specified. Thus, a first Parallel Network that works properly with a second set of other Parallel Networks in a first virtual patient simulation will work again when combined with any third set of Parallel Networks in a second virtual patient simulation.

This design demonstrates a general principle that other scalable complex system simulation programs are likely to reproduce: distinct system problems, including those with important interactions, deserve independent representation in a complex system model. Independent representation greatly facilitates reconfiguration of simulations to portray multiple problems, and does not sacrifice the ability to model interactions between problems.

A second feature of complex system models is that a user (or respondent) may seek a wide variety of information about the system at any time. In the aforementioned Rovinelli patent and Sumner paper, information gathering objects are called Queries (or equivalently, Reveals). A simulator may provide a fixed, stochastically selected, or dynamically generated response to a Query. Normal responses to Queries may not imply any need for additional Queries. Abnormal responses to Queries typically imply that further evaluation or management is required, even if the Query result is a false positive. In clinical settings, for instance, a suspicious mammography result demands repeat testing in a short period of time, even though the results are likely to be normal.

A third feature of a complex system model is that the user may apply (or in the clinical setting, prescribe) a wide variety of Interventions at any time. An Intervention is the application of some new process to the complex system with the intention of changing the progression of a problem or its manifestations, and is part of a broader concept called Course Of Action (COA) in some publications. Interventions typically result in harmful and beneficial effects in defined periods of time, and the user is normally responsible for monitoring both. Because Interventions have different side effects, users are especially responsible for anticipating the side effects of the Interventions they select.

A previously published mechanism for evaluating physician interaction with a patient simulation describes some general principles for using Bayesian networks (Sumner W, Hagen M D, Rovinelli R. The item generation methodology of an empiric simulation project, Advances in Health Sciences Education 1999; 4(1):25-35, incorporated herein by reference). The published method has significant limitations. First, the published method assumes a complicated object called a "Condition" (or Relational Condition) as a common element of virtual patients and state definitions in Bayesian network nodes. Conditions support a plurality of patient characteristics, including two related to physician queries and interventions; record elaborate age information; and describe time only as patient age. Creating grading criteria in Conditions is difficult because the structure is tailored to a different task, tracking patient data. An object devoted to physician actions and describing time relative to other events is preferable.

Second, Conditions do not describe how users schedule subsequent encounters with a virtual patient. This is a serious omission, because the user may waste resources on too frequent encounters or risk deteriorating health between too infrequent visits.

Third, the publication describes Plan objects as comprehensive management strategies, such as "practice guidelines". However, it is often useful to divide guidelines into reusable component parts. While vast Plans may be useful sometimes, component parts are more reusable and maintainable, such as a Plan for checking renal function, a Plan for checking liver function, a Plan for monitoring response to therapy, and a Plan for monitoring evidence of a side effect. A Master Plan may list these component parts.

Fourth, the publication describes evaluating Plans "when the simulation concludes," but the other evaluation processes may be simpler. Some highly interactive skill assessment and feedback processes require dynamic evaluation during a simulation. Checklists of actions can be created dynamically at the onset of a simulation and when relevant to events during the simulation. Moreover, the checklists facilitate evaluation. Furthermore, some Plans can or should be evaluated before the conclusion of a simulation. For instance, if a Health State changes during a simulation, the Plan for the old Health State can be evaluated immediately, and the Plan for the new Health State becomes relevant thereafter. Therefore, Plans may provide information to the simulator when the Plan becomes relevant, and interpret information from the simulation when the Plan is evaluated.

Fifth, the publication describes "an automated critique process," but we have determined that for feedback purposes, a user who is a trainee may wish to view status reports on demand. For instance, the trainee working with a practice test may ask for a status report, and then react to any deficiencies identified in the report. Such a report must be produced on demand.

Sixth, the publication anticipates that "Plans can assemble textual feedback in the same way as queries," but more and different structure is desirable. A Query response structure comprises typically one block of text to return to a user. However, a description of Plan adherence benefits from an overview of context and multiple descriptors of good and bad ideas done and not done, and is therefore more complex than a Query response.

Seventh, the publication does not teach evaluation of the "treatment to goal" principle, although a robust simulator is capable of supporting such an assessment. "Treatment to goal" states that, over time, the user should continue adjusting treatment until a specific goal is achieved, and then should maintain the goal, making further adjustments only to minimize side effects, simplify the treatment, or reduce costs. In the case of blood pressure, the user managing a virtual patient with elevated blood pressure usually should continue adjusting treatment until blood pressure reaches a normal range. The fact that the blood pressure must be above, below, or within a normal range at the conclusion of a simulation is a valid evaluation criterion: users should receive credit or praise when the pressure is within range, and penalties or critiques otherwise.

Eighth, the publication does not teach any process wherein the user critiques the process of care. Queries and Interventions are often useless or harmful when executed incorrectly. For instance, abrupt questioning may discourage patients from answering completely. Chewing nicotine gum, inhaling before discharging a pulmonary inhaler, and a lapse in sterile technique during surgery are all procedural problems that compromise otherwise useful Interventions. In the surgical example alone, it can be useful to evaluate how the user performs an Intervention. In addition, evaluating the user's ability to critique how a patient or colleague performs a task is a distinct process from evaluating the user's technical skill.

Multimedia evaluations

Educational assessment literature and current assessment practices describe multiple techniques for using multimedia in assessment processes. Examiners may use audio recordings to assess skills such as language comprehension or identification of sounds. Examiners use pictures to test recognition of diagnoses in dermatology and radiology. Examiners use graphical tools, such as polygon enclosures overlaid on still pictures, to test plans for applying radiotherapy to malignant masses. Similarly, architectural examinations use incomplete blueprints to test planning skills by adding shapes representing additions or changes to the blueprint. Tactile feedback devices offer additional opportunities to evaluate procedure skills. Examiners have used video clips, especially in videodisc training programs, to illustrate disorders of movement, sensation, bodily function, or thought that the user should diagnose or manage.

We have determined that a number of valuable multimedia assessment processes are obvious extensions of existing methods. Specifically, we believe that the following tasks are extensions of the polygon enclosure task: (1) drawing excision boundaries around a lesion; (2) drawing the boundaries of a cast, brace, or bandage; and (3) locating an anatomical point or region for injection, examination, or imaging.

In addition, examiners may use the following media to require users to make diagnoses: (1) computer-generated fly-through simulations of endoscopies of hollow organ systems; and (2) video clips of functional studies, such as radiographic dye studies and radioisotope tracing studies.

We have determined that multimedia enables two additional evaluation techniques. One group of novel techniques comprises at least one prior art task modified by dynamically generated boundary conditions that maintain consistency with a dynamic simulation. A second group of novel techniques comprises user critiques of decisions portrayed on at least one multimedia image.

SUMMARY OF THE INVENTION

The computer-implemented evaluation system described herein is most advantageously implemented in conjunction with a simulation system that comprises an optional administrative database associating a plurality of users with individualized test requirements and recording the users' performance; a knowledge base describing a complex system and related data; a simulator program for instantiating a complex system from the data in the knowledge base; and a presentation system for displaying patient information to a user and accepting Queries and Interventions from the user. The knowledge base provides data to the simulator and presentation system. The simulator uses the data to instantiate a virtual system, for instance a virtual patient. The presentation system allows the user to inspect the virtual system and attempt to correct or mitigate any abnormalities found. Humans responsible for specifying test content, editing the knowledge base or programming the simulator or presentation system are hereafter referred to as designers. Designers may conflate or divide the simulation components enumerated here, or add new components, while adhering to the user evaluation concepts described herein.

The knowledge base model comprises objects representing Queries; Interventions; and system States, for instance Health States in a virtual patient. The knowledge base may describe how quickly and under what circumstances a State evolves to another State, so that the simulator may change the State portrayed by a virtual complex system. The knowledge base may further describe a complex system having a plurality of simultaneous States. The knowledge base may further allow a designer to recombine a plurality of States in a plurality of unique complex system specifications.

The invention pertains to Plan objects stored in the knowledge base, simulator methods for using Plan objects, and presentation system methods for interacting with the user and reporting evaluation results. Plan objects are advantageously linked to Queries, Interventions, and States, permitting the evaluation process to dynamically adapt to user selections and State changes. Plan objects are recursively defined to facilitate reuse of component Plan structures. At least one Plan object comprises at least one of a Checklist Generator and an Evaluator. Checklist Generators and Evaluators are inference programs, such as Bayesian networks and Neural networks. When a State, Query, or Intervention begins, a Checklist Generator reads complex system data and dynamically infers evaluation Criteria describing desirable and undesirable actions the user might take. Criteria may further define a necessary sequence of user actions. Criteria may further probe user understanding of an Intervention or Query through a dynamically specified interactive task. When a State, Query, or Intervention ends, a report produced for a Checklist Generator informs the user about performance on the Criteria. When a State, Query, or Intervention ends, an Evaluator reads information about the complex system and user interventions to infer a score and generate a report. The retrospective Evaluator report may recognize subtle issues and conditional criteria beyond the scope of a prospective Checklist Generator. Finally, the invention describes processes to combine a plurality of evaluative results into a final score.

The present invention is for a computer implemented process for evaluating user interactions with a dynamic simulation of a system portraying at least one system state and responsive to user queries and interventions. Typically, a test sponsor specifies the simulation content, followed by a test administrator implementing the simulation content. Then, the process comprises the steps of: a. assigning a simulation to at least one user; b. generating a simulated system comprising a system age and at least one system state affecting the system; c. dynamically generating at least one criterion associated with at least one of one system state, a query, a query result, and an intervention; the criterion comprising: (i.) a selected user activity to monitor, the activity selected from the group comprising: (a.) submitting a query to obtain information from the simulated system, (b.) identifying a state portrayed by the simulated system, (c.) starting an intervention to improve the present or future state of the simulated system, or (d.) arranging a disposition comprising scheduling a subsequent interaction between the simulated system and one of the at least one users and an expert in managing a system state; (ii.) a system age range in which to monitor the user activity, the age range comprising a start age and a stop age; (iii.) a classification of the user activity as desirable or not desirable; and (iv.) a weight value selected from a weight value set having at least one weight value; d. accepting at least one user action comprised of the selected user activity and an age of the simulated system when the selected user activity occurs; e. evaluating the at least one accepted user action to determine if at least one of the accepted user action and its consequences require generation of additional criterion and repeating steps c and d if additional criterion require generation; f. determining a status of the at least one criterion dynamically generated in step c; and, g. generating at least one performance description based on at least one of: desirable actions performed; undesirable actions avoided; desirable actions omitted, and undesirable actions committed. Various reporting can be accomplished, including, for example, providing different reports to the test administrator, the test sponsor, and the user.

The invention may also be a computer implemented process for evaluating user interactions with a dynamic simulation of a system portraying at least one system state and responsive to user queries and interventions comprising the steps of: a. assigning a simulation to at least one user; b. generating a simulated system comprising a system age and at least one state affecting the system; c. accepting at least one user action by the user, the user action selected from the group comprising: (i.) submitting a query to obtain information from the simulated system; (ii.) proposing an explanation of a perceived state of the simulated system; (iii.) starting an intervention to improve a present or future state of the simulated system; or (iv.) arranging a disposition comprising scheduling a subsequent interaction between the simulated system and one of the assigned user and an expert in managing a system state; d. associating at least one of a system state and the at least one accepted user action with at least one inference program; e. evaluating at least one criterion by the at least one inference program, the evaluating comprising the steps of: (i.) comparing the at least one criterion to the accepted at least one user action; (ii.) determining a status of the at least one criterion; (iii.) entering the status of the at least one criterion as input data to the inference program; (iv.) entering patient data as input to the inference program; and (v.) obtaining at least one performance description as an output from the inference program.

Even further, the present invention may also be a computer implemented process for evaluating user interactions with a multi-factoral system simulation wherein at least one recursively defined evaluation structure coordinates an assessment of said user interactions, comprising the steps of: a. identifying at least one evaluation structure linked to at least one of a complex system, a state of the complex system, a query that reveals information regarding the complex system, a specific response generated by the query, and an intervention; b. obtaining recursively from the evaluation structure at least one of an inference program and a list of subordinate evaluation structures; c. collecting a plurality of the inference programs by recursive inspection of evaluation structures; d. using the plurality of inference programs identified in step c to dynamically evaluate the user interaction with the system simulation; e. calculating for each of the plurality of inference programs at least one performance description based on the user interaction with the simulation; and f. associating the at least one performance description with at least one assessment theme selected from a set of at least one assessment themes.

BRIEF DESCRIPTION OF THE DRAWINGS

FIG. 4A/4B is a table enumerating the major events related to evaluation.

FIG. 5 illustrates an exemplary generic feedback format for a Master Plan in accordance with an embodiment of the invention.

FIG. 10 enumerates the possible time relations between two events.

DETAILED DESCRIPTION

The Simulation System

Figure 1:
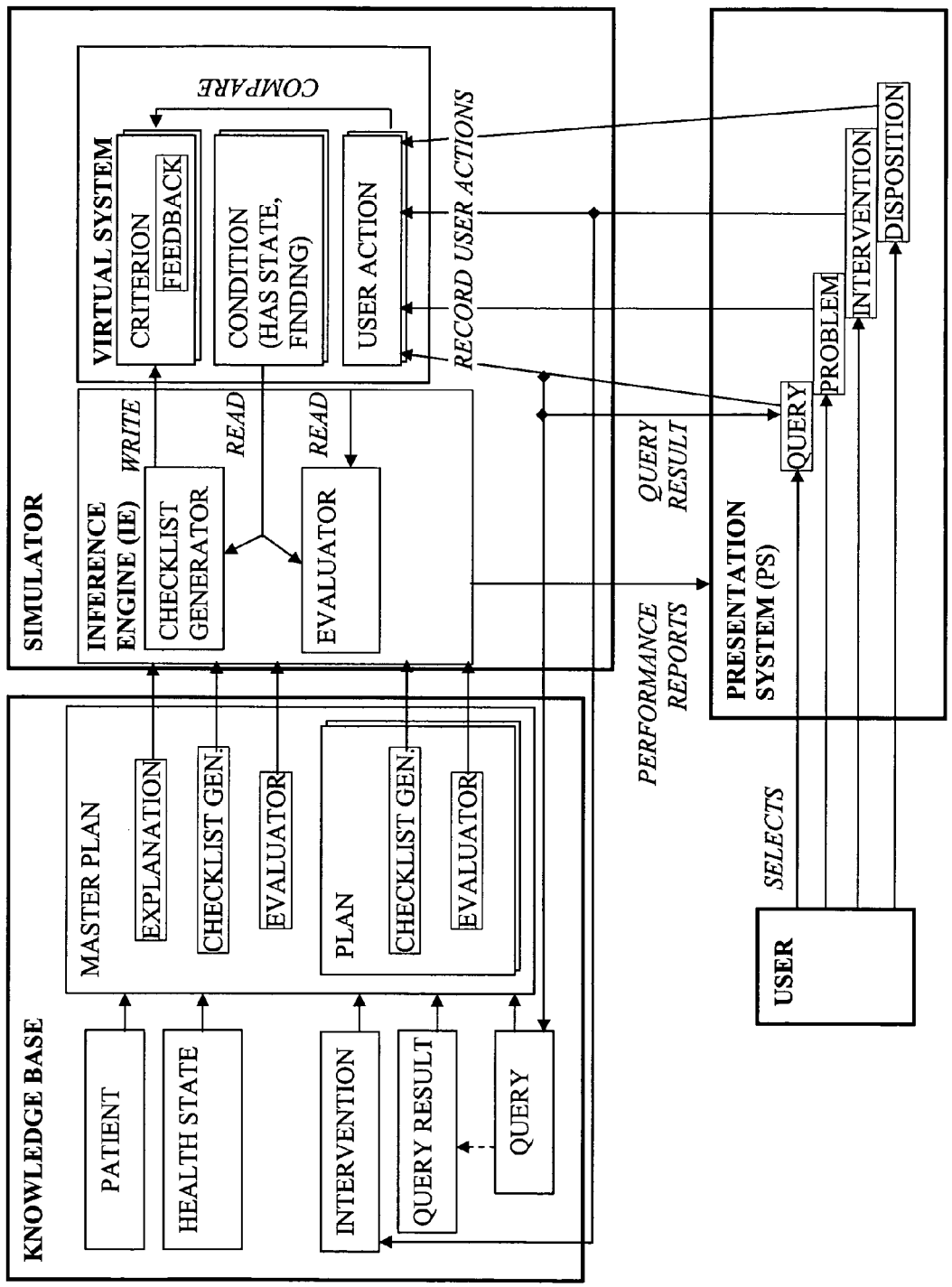
FIG. 1 is a block diagram of the system of the present invention.

The computer-implemented evaluation system described herein is most advantageously implemented in conjunction with a simulation system that comprises an optional administrative database associating a plurality of users with individualized test requirements and recording the users' performance; a knowledge base describing a complex system and related data; a computer program for simulating an instance of a complex system from the data in the knowledge base; and a component for presenting patient information to a user and accepting Queries and Interventions from the user. These components are hereafter referred to as the administrative database, the knowledge base, the simulator, and the presentation system. The knowledge base provides data to the simulator and presentation system. The simulator uses the data to instantiate a virtual system, for instance a virtual patient. The presentation system allows the user to inspect the virtual system and attempt to correct or mitigate any abnormalities found. Humans responsible for specifying test content, editing the knowledge base or programming the simulator or presentation system are hereafter referred to as designers. Designers may conflate or divide the simulation components enumerated here, or add new components, while adhering to the user evaluation concepts described herein.

The knowledge base model comprises objects representing Queries; Interventions; and system states, for instance Health States in a virtual patient. The knowledge base may describe how quickly and under what circumstances a Health State evolves to another Health State, so that the simulator may change the Health State portrayed by a virtual patient. The knowledge base may further describe a patient having a plurality of simultaneous Health States. The knowledge base may further allow a designer to recombine a plurality of Health States in a plurality of unique patient specifications.

The knowledge base may further describe characteristics of a system when a specific state is present, for instance, a Finding that typically accompanies a Health State. The selection of Health States and Findings for a given virtual patient may include stochastic methods. The knowledge base describes some method by which Query objects inspect the state of a simulated complex system. For instance, a Query object may represent the question, "Do you hurt anywhere?" or the measurement of blood pressure in a virtual patient. A Query object's method for producing a result may involve stochastic processes. For instance, a stochastic mechanism may introduce measurement noise, or cause the virtual patient to offer a deceptive answer. The knowledge base will further describe how a Finding changes in the presence of an Intervention, and how an Intervention affects the evolution of a Health State. U.S. Pat. No. 6,246,975, Rovinelli et al, describes one arrangement of these data in detail, and the process and method of creating a virtual patient from these data.

The simulator maintains a list of at least one Condition object. The Condition object describes the occurrence of one of a system state (such as a Health State), a Finding, and an Intervention in a virtual system (such as a virtual patient). A Condition object describes times when the state, Finding, or Intervention began and ended. A Condition may further define the degree of an event. For instance, a Condition may describe the strength or dose of an Intervention over time.

The presentation system shows the results of Queries to the user, and allows the user to select Queries and Interventions, and advance the simulated time. User selected Queries and Interventions correspond to objects in the knowledge base. The simulator continuously records which Queries and Interventions are selected during a simulation. The administrative database may retain similar information after a simulation ends.

In one implementation of the simulation system, Queries may access a calculation object that combines input data from at least one of a Finding, a Health State, and an Intervention to produce a precise output value. For instance, a calculation object may combine the virtual patient's baseline blood pressure (a Finding) and the expected reduction in blood pressure caused by a blood pressure medication (an Intervention), to dynamically generate the blood pressure reported to the user. In one exemplary implementation of the simulation system and knowledge base, these calculation objects are called "Numeric Reveals." Calculation objects may also obtain as inputs quantitative values describing the virtual patient's relationships to other simulation objects. An exemplary but non-exhaustive list of the input values that describe relationships comprises counting Interventions, duration of an Intervention, counting repetitions of a Query, and time between repeated queries.

The aforementioned structures are parts of a simulation system with highly reusable components. The structures are reusable in at least two important aspects. First, a plurality of virtual patient simulations may simultaneously refer to the structures as represented in a single simulator program. Second, a plurality of case descriptions in a knowledge base may refer to identical objects. The aforementioned structures are not descriptive of the present invention except in that the structures comprise an exemplary compatible simulation system. A simulation system with fewer reusability requirements may comprise similar or simpler structures, but will necessarily include concepts corresponding to system states (such as Health States), Queries, and Interventions.

The computer-implemented evaluation system described herein comprises structural additions to the knowledge base and methods in the simulator and presentation system, independent of the exact implementation of the knowledge base and simulator. For instance, an implementation that conflates knowledge base data and simulator functions would nevertheless retain structures and methods related to Health States, Queries, and Interventions.

The Knowledge Base for Evaluation

The knowledge base evaluation components minimally comprise objects representing at least one inference procedure and at least one Criterion. In one exemplary implementation, the knowledge base comprises a Master Plan. The Master Plan optionally comprises a list of at least one subordinate Plan. The subordinate Plan optionally comprises all of the attributes of the Master Plan. The Master Plan may comprise at least one inference procedure or alternatively only subordinate plans. The inference procedure is capable of at least one of generating and evaluating at least one Criterion. The inference procedures include at least one of a Checklist Generator and an Evaluator. See FIG. 3. The inference procedures optionally further include an Explanation procedure. The inference procedures may be implemented as any inference or scripting program, such as a Bayesian network, which can dynamically generate a description of the status of a complex system A Master Plan represents a collection of system management ideas comparable to a clinical guideline in medicine. The Explanation attribute invokes a program that dynamically summarizes the guideline recommendations in readable text. The component Plan objects implement specific parts of the guideline, in a reusable format. A plurality of guidelines may apply in a given clinical scenario. Therefore, objects in the knowledge base corresponding to Health States, Queries, and Interventions may comprise at least one Master Plan in addition to attributes required for simulation purposes. In one exemplary embodiment of the invention, the knowledge base definition of a complex system, such as a patient, additionally comprises at least one Master Plan. The Master Plan permits an additional level of customization of the evaluation process by providing a fully customized Explanation, Checklist Generator, Evaluator, and subordinate Plan list.

A Plan object comprises at least one of a Checklist Generator and an Evaluator. The Checklist Generator produces a list of at least one evaluation Criterion responsive to the context in which the Plan is identified. The Checklist Generator can produce the list of Criteria at the moment that it becomes relevant. The implication is that the Criteria from the Checklist Generator are predictably relevant no matter what else the user does. The evaluation algorithm can simply mark each Criterion when performed by the user. For instance, in any simulation of hypertension, the user should prescribe an Intervention to lower blood pressure. At the moment that the simulator models the hypertension Health State, a Checklist Generator can produce a Criterion asserting that some medical treatment is required. The Checklist Generator further can select a subset of Interventions responsive to concurrent Health States. For instance, a Checklist Generator could assert that angiotensin converting enzyme inhibitors are preferred medications if a virtual patient portrays both hypertension and diabetes Health States. After asserting a Criterion, the evaluation system can mark it as completed at any moment that the user performs it. In contrast, the Evaluator is responsive both to the context in which the Plan is identified and to user activity. The Evaluator analyzes at least one Criterion, and typically a plurality of Criteria and patient Conditions, when a Plan ceases to be relevant. For instance, a hypertension Evaluator could require that the user diagnose both hypertension and diabetes before prescribing an ACE inhibitor. This analysis can only be completed after the user has an opportunity to record diagnoses and Interventions.

The Checklist Generator and Evaluator are inference programs, such as Bayesian networks. For evaluation purposes, inference programs require as input at least one virtual patient Condition. The context in which a Plan object is identified will imply a virtual patient Condition. The implied Condition need not be explicitly defined as an input if the Plan object is always relevant in the context of that Condition. If the Plan is relevant in multiple contexts, but responsive to the context, then the inference program requires at least one of an explicitly defined Condition and a Criterion to differentiate between contexts. Any other input Conditions must be explicitly defined. The Checklist Generator must provide as output at least one Criterion, responsive to at least one input. The Evaluator must accept as input at least one Criterion. All input Criteria must be explicitly defined. For a Bayesian network acting as the inference program, the Criterion may define the state of a Bayesian node in the network.

Criteria

A Criterion comprises at least one of a User Action, a complex system Outcome, or a Temporal Criterion. See FIG. 8. A Criterion further has a status described as pending, met, failed, and canceled. The Criterion status is pending when the Criterion is first identified. The Criterion is met if the user completes the specified requirement. The Criterion is failed if the user does not complete the requirement. A first Criterion is canceled if a second Criterion contradicts the first Criterion when the first Criterion has pending status. A Criterion may further specify a numeric value. A Criterion's status and value change responsive to User Actions.

User Action Criteria

A User Action minimally comprises one user activity to monitor, an earliest and latest relative time for performing the action, a classification of the user activity as desirable or undesirable, and a scoring weight. The earliest and latest relative times are at the beginning and ending of the simulation if not explicitly declared. The scoring weight is unity (1) if not explicitly declared. Distinct scoring weights may be assigned for a User Action that is completed versus incomplete.

A user activity comprises one of a Query, Intervention, Problem, and Disposition. A user activity may further comprise an Abstract Object representing a collection of other abstract objects or concrete objects. A concrete object is accessible to the user through the presentation system, while an Abstract Object is not directly accessible to the user. For instance, an inaccessible abstract Query called "assess renal function" may comprise a plurality of accessible Queries such as "Creatinine" and "24 hour creatinine clearance." The Problem comprises a system state (such as a Health State), Finding, or other circumstance deduced by the user and recorded through the presentation system. For example, the user might record "Hypertension" as a Health State or "Elevated Systolic Blood Pressure" as a Finding. The Disposition comprises at least a return visit, and optionally but not exhaustively hospitalization, referral to the emergency room, re-evaluation without release, and conclusion of the simulation.

In one implementation of the invention, a Criterion further comprises at least one of Positive feedback and Negative feedback. Positive feedback is a distinct descriptor, for instance a short textual phrase, of the Criterion when fulfilled. Negative feedback describes the Criterion when not fulfilled. For example, Positive feedback might comprise the phrase, "Renal function testing was done" and Negative feedback might comprise the phrase, "Renal function testing was not done." Positive feedback and Negative feedback may comprise media other than text, such as to produce audible, visual, or tactile experiences for the user.

In an exemplary model of the knowledge base and simulator, Intervention descriptions include information about the dose and duration of treatment and an Abstract Object enumerates a plurality of Interventions. The Abstract Object thereby specifies doses and durations of treatment. In a second embodiment of the knowledge base and simulator, the user may specify at least one of the dose and duration of an Intervention. In this embodiment, at least one of the Abstract Object and the User Action object must specify the dose and duration of treatment.

Interactive Criteria

Many user activities require some skill to execute. Selection of such a user activity does not demonstrate that the user has the requisite skill to execute it. Furthermore, the execution of such user activities is inherently dynamic in real life. For instance, the technique required to assess the size of a defect or to repair a defect may depend on how long the defect has been developing, as well as the arsenal of inspection and repair processes available to the user. Observation of the skill in actual application, a physical simulation, or a virtual reality simulation may demonstrate that a user has mastered such a skill. In such settings it is possible to measure nuances such as tone of voice, facial expression, pressure, speed, timing, depth, and coordination of multiple activities. However, a user may demonstrate a deep understanding of the skill in a simpler virtual system by satisfying an optional Interactive Assessment requirement of a Criterion comprising a User Action.

Figure 9:
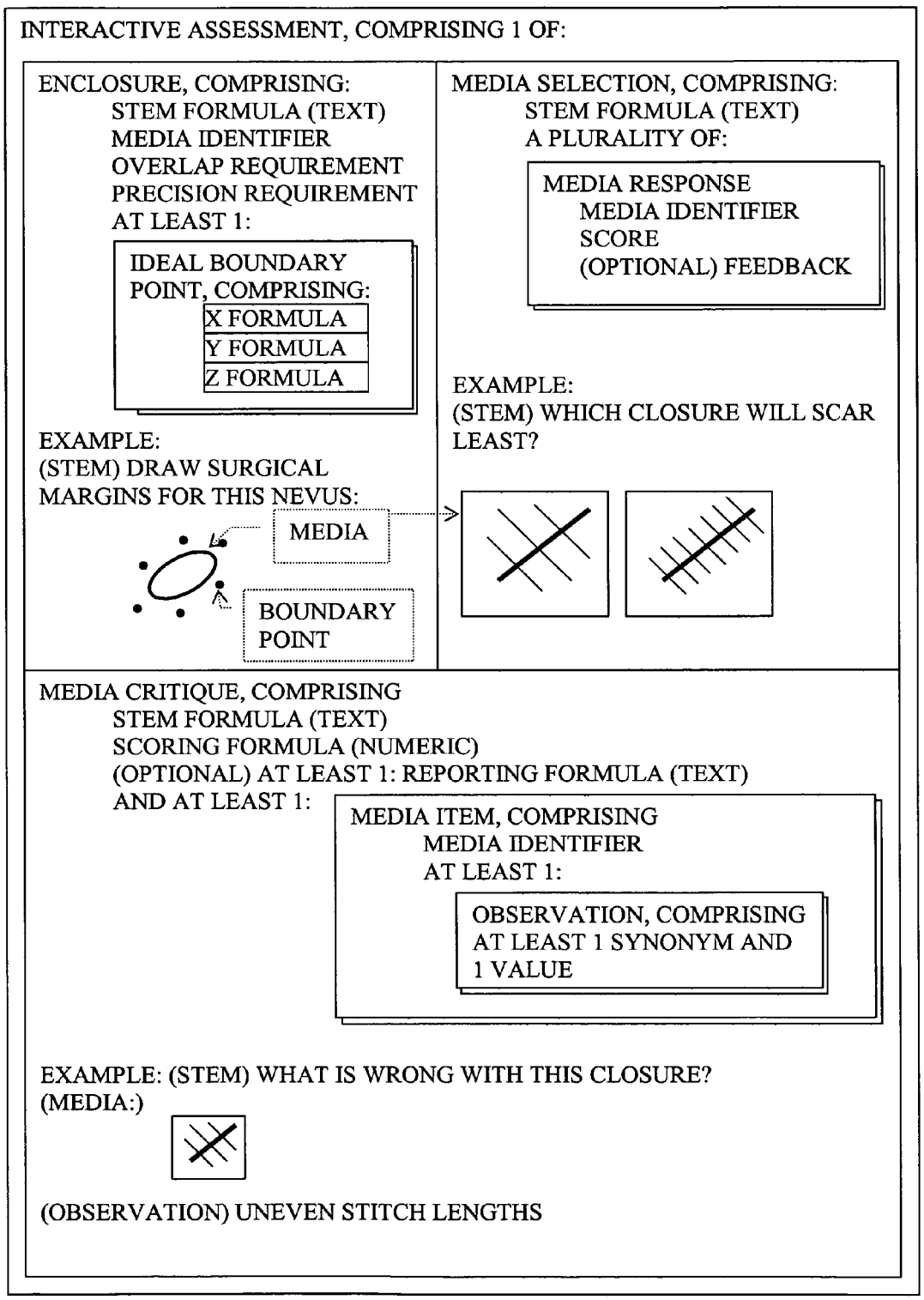
FIG. 9 illustrates three Interactive Assessment techniques.

With reference to FIG. 9, an Interactive Assessment comprises one of an Enclosure task, a Media Selection task, and a Media Critique task. The Enclosure is a dynamically generated boundary specification with requirements for how closely the user should approximate the boundary. A Media Selection task requires the user to select at least one dynamically generated non-textual representation of a user activity from a plurality of such representations. A Media Critique task requires the user to describe at least one feature of at least one non-textual representation of a user activity.

An exemplary use of an Interactive Assessment Criterion occurs when a user selects a Query or Intervention. The user action may cause a Checklist Generator to produce an ordered list of Criteria. The simulator will inspect the list of Criteria immediately to locate Interactive Assessment Criteria. The simulator dynamically generates the Stem and locates the required Media of the first Interactive Assessment Criterion. The simulator sends the Stem and Media to the presentation system. The user responds to the Stem and Media. The presentation system returns this user data to the simulator. The simulator compares the user data to the requirements of the Criterion. If the requirements are met, the Criterion status is true.

A second use of an Interactive Assessment Criterion occurs when a Plan comprises first a Checklist Generator producing the Criterion as an output and second an Evaluator using the Criterion as an input. The Criterion is presented to the user when generated by the Checklist Generator. The user response establishes the status and value of the Criterion. The status and the value are read as inputs to the Evaluator.

Uniquely among the types of Criteria, an Interactive Assessment Criterion may also be logically placed in the output of an Evaluator. In this case, the Evaluator must execute while the simulation is in progress. The Interactive Assessment Criteria is retrospective. An exemplary use is to determine whether the user recognizes a potential complication of an Intervention, but only at the end of the simulation, when the question will not cause confusion about whether the system is portraying the complication.

Interactive Assessment: Enclosures

Prior art teaches that static testing systems may present the user with a spatial fault in the system which requires recognition or management. The fault is typically presented to the user in a two dimensional projection, such as a photograph, radiographic image, or temporal tracing such as an electrocardiogram, or an electroencephalogram. The user can demonstrate recognition of the extent of the fault by enclosing the fault with a polygon. The user polygon can be compared to a designer-generated ideal boundary and overlapping criteria. For instance, the criteria may state that the user polygon must overlap at least 80% of the ideal boundary, and the ideal boundary must overlap at least 90% of the user polygon. The ideal boundary may be a polygon or any suitable formulaic method or vector representation, for instance, the center and radius for a circle.

A dynamic simulation of a complex system may dynamically generate the dimensions of a fault. Furthermore, the dimensions of a fault may change at rates dependent on User Actions. Furthermore, the dimensions of an ideal boundary may be responsive to other User Actions. Furthermore, a plurality of acceptable polygons may be more descriptive than a single ideal boundary. Consequently, the system may need to dynamically generate at least one combination of polygon and overlap criteria for evaluation against a user polygon.

For instance, in the preferred embodiment of the simulation system, portraying a patient with lung cancer, the image of the cancer is naturally projected onto a two-dimensional radiographic image. The cancer might grow steadily as the simulation proceeds. The user may draw a polygon to indicate the extent of the cancer, or to select a surgical resection area or irradiation treatment area. A dynamic simulation may need to constantly adapt these. For instance, the size of the ideal radiation treatment area might vary with the age of the tumor and concurrent Interventions. The exact radiation treatment area might vary due to anatomic structures that radiation risks injuring.

An Enclosure comprises a Stem formula, a Media Identifier, an Overlap requirement, a Precision requirement, and an Ideal Boundary definition. The Stem formula generates a Stem for presentation to the user, optionally responsive to the state of the inference program generating the Criterion. The Stem describes the task the user should attempt in the Interactive Criterion. The Media Identifier locates an image to display to the user, optionally responsive to the state of the inference program. The Overlap requirement indicates what portion of the Ideal Boundary the user polygon must cover. The Overlap Requirement may further comprise at least one of a positive feedback instruction and a negative feedback instruction. The Precision requirement indicates what portion of the user polygon may lie outside of the Ideal Boundary. The Precision Requirement may further comprise at least one of a positive feedback instruction and a negative feedback instruction. The positive feedback instruction and negative feedback instruction may specify a phrase or media to display to the user when a requirement comprising the instruction is met or not met. The Ideal Boundary definition comprises one of at least one boundary point and a formulaic definition. A boundary point comprises at least one of an X, Y, and Z formula for calculating a value responsive to the state of the inference program generating the Criterion. X values define points on a one-dimensional line, such as time. X and Y values define a point in a two-dimensional plane, such as an X-ray image. X, Y, and Z values define a point in a three dimensional space, such as a three dimensional simulated wire frame. A formulaic definition comprises a typical mathematic formula, such as those defining shapes and volumes.

In one embodiment of the current invention, the use of an Interactive Assessment Criterion occurs when a user-selected Query or Intervention causes a Checklist Generator to produce an Interactive Assessment Criterion. The simulator dynamically generates the Stem, locates the required Media, and calculates a boundary definition. The simulator sends the Stem and Media to the presentation system. The user draws a polygon in response to the Stem and Media. The presentation system returns this user polygon to the simulator. The simulator compares the user polygon to the dynamically generated ideal polygon. If the boundary requirements are met, the Criterion status is true.

In another embodiment of the invention, the Enclosure comprises a plurality of polygons. For each polygon, the Enclosure further defines an Overlap requirement, a Precision requirement, and a numeric value. The simulator selects the highest valued polygon which meets the Overlap and Precision requirements when compared to the user polygon. If any polygon meets the requirements, then the Criterion status is true. The numeric value of the Criterion is set to the value of the selected polygon. The inference engine may use this value as an input.

Interactive Assessment: Media Selection

Prior art teaches that a static testing system may require the user to select one image from a plurality of images, in response to a stem. Prior art further teaches that a reproducible process may generate a plurality of such images prior to an examination. In the present invention, the simulator dynamically controls a similar item generating process during the simulation. A Media Selection object comprises a Stem formula and a plurality of Media Response objects. Each Media Response Object comprises a Media Identifier, a Score, and optionally a Feedback phrase. The Stem and Media Identifier are optionally responsive to the state of the inference engine that selects the Criterion. The simulator uses the Score of the user-selected Media Response to set the value and status of the Media Selection Interactive Assessment Criterion. The simulator sets the status of the Criterion to true if the value is positive, and otherwise sets the Criterion status to false. The Feedback comprising the Media Response is a phrase summarizing performance. The simulator produces a user performance report comprising the Feedback for the Checklist Generator.

For instance, in an exemplary virtual patient simulation, only an Intervention related to excising a lesion would link to a Master Plan comprised of a Checklist Generator having an Interactive Assessment Criterion that requires the user to select a best illustration of surgical wound closure. Therefore the wound closure item only appears when the user selects an Intervention to excise a lesion. The Stem may indicate the context of the wound, for instance, by stating, "Following excision of this facial lesion, which wound closure will cause the least scarring?" The media may illustrate where the surgical wound is on the face.

Interactive Assessment: Media Critique

Prior art teaches that training programs may use media as a subject of discussion, and especially to demonstrate appropriate and inappropriate behaviors by a user's peers, and to illustrate ominous and reassuring system states. In the present invention, the simulator dynamically controls a similar item generating process during the simulation. A Media Critique object comprises a Stem formula, a Scoring formula, and a plurality of Media Item objects. Each Media Item Object comprises a Media Identifier, and at least one Media Item further comprises an Observation associated with a value. The Stem and Media Identifier are optionally responsive to the state of the inference engine that selects the Criterion.

In one embodiment of the invention, a user activity causes a Checklist Generator to generate an Interactive Assessment Criterion with a Media Critique object. The simulator assembles the Stem and at least one Media Identifier responsive to the solution of the Checklist Generator. The simulator further assembles a list of observations. Each observation comprises at least one Synonym and one Value. A Synonym may be a regular expression. Regular expressions are flexible pattern-matching instructions, which are appropriate for comparing to unstructured spoken or written text. The presentation system displays to the user the Stem and the at least one media file located by the Media Identifier. The presentation system allows the user to respond to the Stem by any suitable interface, such as pointing with a computer mouse and clicking, typing, or speaking. If necessary, the simulator attempts to match a user response to one Synonym. One of the simulator and the presentation system match the Synonym to its Observation. The simulator uses the Scoring formula in the Media Critique to combine the values attached to matched Observations. The status of the Interactive Assessment Criterion is established by the score produced by the Scoring formula comprising the Criterion. The simulator sets the status of the Criterion to true if the score is greater than zero and false otherwise.

For instance, in an exemplary virtual patient simulation, only an Intervention related to excising a lesion would link to a Master Plan comprised of a Checklist Generator having a Media Critique Interactive Assessment Criterion that requires the user to critique an illustration of a surgical wound closure. The wound closure Media Critique therefore only appears when the user selects an Intervention to excise a lesion. The Stem comprising the Media Critique may indicate the context of the wound, for instance, by stating, "Critique this excision of a facial lesion." The Media Item comprising the Media Critique may illustrate that the sutures around the surgical wound have unevenly separated entry and exit points. The user may write that "The sutures are irregular." This phrase may match a literal Synonym string, or satisfy a regular expression in one Synonym. The Observation comprised of the Synonym is thereby matched to the user response. The simulator uses the value of the Observation to calculate a score from the Scoring Formula comprising the Media Critique. The simulator sets the status of the Criterion to true if the score is positive, and otherwise sets the Criterion status to false. The Reporting Formula comprising the Media Critique generates a phrase summarizing performance, such as, "You correctly noted uneven suture sizes." The simulator produces a user performance report comprising the phrase for the Checklist Generator.

System Outcome Criteria

A System Outcome definition is similar to a User Action definition. A System Outcome definition minimally comprises a virtual system attribute to monitor, an earliest and latest relative time for monitoring the attribute, a classification of the Outcome as desirable or undesirable, and a scoring weight. The system attribute is at least one of a system state, a Finding, and a range of responses to a Query. The earliest and latest relative times are at the beginning and ending of the simulation if not explicitly declared. The scoring weight is unity (1) if not explicitly declared. Optionally, distinct scoring weights may be assigned for a System Outcome that is achieved versus not achieved. An unspecified scoring weight for an outcome that is not achieved is zero.

In one embodiment of the invention, a Numeric Outcome is an additional type of Outcome definition. A typical application of a Numeric Outcome determines whether the user has adequately treated a patient. For instance, A Numeric Outcome object may assess whether the treated systolic blood pressure is between 100 and 140 after exactly 1 year of management. A Numeric Outcome definition minimally comprises an identifier of a dynamically calculated value of the virtual patient, an earliest and latest relative time for monitoring the attribute, a numeric range of permissible values, a permissible distribution descriptor, a classification of the Outcome as desirable or undesirable, and a scoring weight. As reduced to practice in one embodiment of the invention, a Numeric Reveal object is the calculation object that identifies the dynamically calculated value, such as "systolic blood pressure" in the example. The numeric range of permissible values minimally comprises highest and lowest real number boundaries, such as "140" and "100" in the example. In another implementation of the intervention, the evaluation system further comprises a map from Numeric Outcome boundary values to scoring weights. Attributes shared with the Outcome structure have unchanged meaning in Numeric Outcome. The permissible distribution descriptor is not required when the earliest and latest relative start times define a point in time, such as "after exactly 1 year" in the example. The Numeric Outcome is met if the dynamically calculated value at that moment is in the numeric range of permissible values. The permissible distribution descriptor is required when the earliest and latest relative start times define an interval in time. The permissible distribution descriptor comprises an instruction to indicate which one of the following exemplary but non-exhaustive list of statements must be true for the Numeric Outcome to be reached: (1) every calculated value during the interval is in the numeric range of permissible values; (2) any value is in the range; (3) the average value is in the range; (4) the standard deviation of values is in the range; (5) the minimum value is in the range; (6) the maximum value is in the range. Additionally, the distribution descriptor comprises a list of at least one moment within the time interval when the simulator should generate a calculated value. In one embodiment of the invention, the distribution descriptor is identical for all Numeric Outcomes. In this embodiment, at least one of the instruction and the list of at least one moment within the time interval is assumed in the evaluation system, and need not be specified in any supporting data base. In another implementation of the invention, the user is required to independently cause the simulator to generate the dynamically calculated value. The user causes the Numeric Outcome calculation by requesting a related Query. In this implementation, the list of at least one moment within the time interval is omitted. For instance, at 11 months into a simulation, a user may request a Query of a virtual patient to obtain a blood pressure. The blood pressure Query causes a calculation object to generate a value for the systolic blood pressure. The evaluation system can then determine whether the systolic blood pressure meets the Numeric Outcome Criterion. If the Numeric Outcome has no distribution descriptor, the evaluation system determines first whether any systolic blood pressure values were calculated between 10 and 14 months, and second whether each such value is between 100 and 140.

In one embodiment of the invention, a single Criterion structure implements Action and Outcome specifications. In another embodiment, two distinct structures implement Actions and Outcomes. In yet another embodiment, multiple distinct structures implement Query Actions, Intervention Actions, Disposition Actions, Finding Outcomes, Health State Outcomes, Query Result Outcomes, and Numeric Outcomes.

Temporal Criteria

In one embodiment of the invention, a-Temporal Criterion extends the Criterion concept. A Temporal Criterion comprises at least one first User Action and at least one second event comprised of at least one of a second User Action, Condition, and Outcome. The Temporal Criterion evaluates the relationship in time between the first User Action and the second event.

We have determined that 13 temporal relationships are relevant to Temporal Criteria when the first User Action and the second event each occur once. See FIG. 10. At least one descriptive continuous value can be calculated for any temporal relationship. A continuous value can be calculated from the endpoints of the two events. In one embodiment of the invention, a default equation is associated with each temporal relationship. In another embodiment of the invention, a designer may specify in the knowledge base an equation to generate a continuous value.

Temporal Criteria provide advantageous descriptors of user performance for the evaluation process. Temporal Criteria specify moderately complicated relationships, such as whether one therapy began before another. Temporal Criteria concisely implement evaluation questions such as "Was diet tried before diabetes medication?" A list of Temporal Criteria can evaluate whether any sequence of two or more Interventions adheres to a predetermined sequence guideline. Furthermore, continuous values calculated for Temporal Criteria allow very precise comparisons of the timing of multiple events.

Evaluation Methods in the Simulator

The simulator generates Criteria objects dynamically. Optionally, at least one Plan generates at least one Criterion in the process of solving a Checklist Generator inference program. In one embodiment of the invention, at least one Criterion is the definition of at least one state of at least one output Bayesian node of at least one Bayesian network representing a Checklist Generator. In the preferred embodiment of the invention, a knowledge base structure specifies at least one Criterion. In another embodiment of the invention, the administrative database specifies at least one Criterion.

The simulator necessarily maintains a list of characteristics of the complex system it portrays. In addition to this list, it maintains lists of the Queries, Interventions, and Dispositions performed by the user during the user's interaction with the complex system portrayal. In one compatible implementation of a simulator, a virtual patient maintains a list of Conditions describing pertinent Health States, Findings, and Interventions. The simulator further generates and maintains a checklist of at least one Criterion, as described in greater detail below, and maintains a list of at least one User Action, as detailed below.

The simulator optionally generates the checklist of Criteria related to a complex system state, such as a Health State, by a series of steps comprising:
1. Generating a complex system simulation, such as a virtual patient, for a user to manage.
2. Identifying at least one current system state, such as a Health State, present when the user begins managing the complex system simulation.
3. Identifying at least one Master Plan associated with the current system state.
4. Optionally generating, from the Explanation attribute of the Master Plan, a user-interpretable description of the grading criteria pertinent to the complex system.
5. Identifying at least one Plan associated with or identical to the Master Plan.
6. Identifying at least one Checklist Generator, an inference program such as a Bayesian network, associated with the Plan.
7. Providing at least one input datum, such as a virtual patient Condition, that defines the state of an input Bayesian node, to the Checklist Generator. Step 7 is implicit when the association of the Plan with the current system state implies the only necessary input for a Checklist Generator.
8. Generating at least one Criterion as an inference from the input data, for instance, by copying a Criterion that defines the state of an output Bayesian node of the Checklist Generator.
9. Processing the Criterion:
   a. If the Criterion is not an Interactive Assessment Criterion: Calculating actual starting and ending time constraints from the simulated time and the relative starting and ending time constraints of the copied Criterion. For instance, a simulator adds the age of the virtual system at the time the Criterion is copied to the starting and ending times to obtain a Criterion where the starting and ending times are expressed as system ages.
   b. If the Criterion is an Interactive Assessment Criterion:
      i. Generating the required Stem and at least one Media Identifier.
      ii. Presenting the Interactive Assessment task to the user.
      iii. Obtaining a response from the user.
      iv. Calculating a Criterion value and status from the user response.
10. Associating the Criterion with the Plan that generated it and the complex system.

In identical manner, the simulator further optionally generates a checklist of at least one Criterion related to an Intervention selected by the user. Such an Intervention object generates at least one Master Plan. The Master Plan generates an Explanation and at least one Criterion. Some Interventions may not require any subsequent action by the user. For instance, a vaccine given once in a lifetime may require no further Action by the user. The simulator immediately generates a checklist of Criteria for any Intervention with a Master Plan. These Criteria may require that the user ask a Query or adjust an Intervention in any time frame including the past and future. For instance, a prerequisite Criterion may identify an abstract Query to perform prior to prescribing an Intervention, so that starting and ending times of the Criterion are in the past. Alternatively, the Criterion may describe an event that can occur immediately or any time in the next three months. Furthermore, the Criterion may describe an event that must not occur for at least three months, but should occur before 6 months pass. Finally, the Criterion may identify a time frame from the past to the future.

The simulator further optionally generates a list of at least one Criteria related to a Query result. However, different query results and different reasons for obtaining the initial Query imply different evaluation criteria for subsequent actions. For instance, a real patient who takes an anticoagulant needs regular monitoring of blood coagulation properties, and very rapid repeat testing, counseling, and possibly dose adjustment if the results are normal. In contrast, a real patient who does not take an anticoagulant needs no further testing when the results of coagulation studies are normal, but may need extensive testing if the results are abnormal. Consequently, a Query regarding a simulated patient may produce either a normal or abnormal result requiring additional reaction from the user, dependent on the context. The Query object is not fully reusable unless the Master Plan associated with each Query result can provide a context specific Explanation and list of Criteria. Advantageously, the inference programs associated with Master Plans and Plans can inspect the virtual patient to produce Explanations and Criteria responsive to simulation content.

The simulator continuously monitors User Actions, recording each User Action and the age at which it occurs as virtual patient data. The simulator also compares each User Action as it occurs with the virtual patient's list of Criteria. A User Action fulfills the requirements of a Criterion if and only if it meets the following criteria:
1. The user-selected Query, Problem, Intervention, or Disposition is identical to or a descendant of the corresponding activity described in the Criterion.
2. The virtual patient age at the time of the user-selected activity is between the start age and the ending age of the Criterion.

For a criterion which must be handled immediately, the start age and ending or stop age are implicitly equal to the current age of the simulated system. When the criterion can happen at any time, the start age is the current age of the simulated system and the ending age is the maximum age of the simulated system. The start age and stop age can be dependent on other events or independent thereof. Start age to stop age is defined as a system age range.

When a User Action fulfills the requirements of a Criterion, the Criterion is marked as occurring, whether or not it was desirable that it should occur.

The simulator can optionally produce a status report for any or all Criteria on demand. The status report includes, for each Master Plan, an Explanation and at least one Criterion, and the desirability and status of each of the Criterion. These data optionally may be tagged, along with additional details, in XML, and formatted for display by the presentation system. Advantageously, the XML tagging allows the presentation system to reformat the status report in any appropriate format. For instance, the simulator may produce a status report comprising a tagged Explanation and tagged list of at least one item derived from at least one Criterion, wherein the tagged list item carries a tagged descriptor appropriate to the status of the Criterion, a tagged status flag, a tagged desirability flag (Interactive Assessment Criteria are always flagged desirable), and the tagged age when completed. The presentation system may use the status report to construct a two-by-two table, with desirable (d) items on the first row, undesirable (u) items in the second row, completed (c) items in the first column, and incomplete (i) items in the second column. Each cell of the table describes a different group of items, for instance, appropriate choices are enumerated by (d-c) items in the top left cell, and appropriate omissions by (u-i) items in the bottom right. Inappropriate omissions are enumerated by (d-i) items in the top right cell, and inappropriate actions by (u-c) items in the bottom left cell. These cells may be highlighted to draw attention to appropriate and inappropriate user activities, as in FIG. 5 of the attached drawings.

An in-progress or final summary score of user performance may rely entirely on Criteria generated by a Checklist Generator. In one embodiment of the invention, such an evaluation occurs primarily in the simulator, while the virtual patient remains fully accessible. The simulator can tally the weights assigned to each desirable-completed and undesirable-incomplete Criterion to the user's credit, and tally weights assigned to each undesirable-completed and desirable-incomplete Criterion to the user's discredit. In another implementation of the invention, the Criterion has different weights representing completed and incomplete status. The weight corresponding to the status of the Criterion is used. The simulator may apply any suitable mathematical formula to the weights, such as taking the maximum or minimum weight in any of the four cells, performing arithmetic operations on weights within or between cells, or using weights as exponents in predictive equations. One simple metric is to test whether a sum of credits outweighs a sum of discredits. The simulator or an external program may apply standard statistical algorithms to the two-by-two table.

The simulator may produce final reports on Criteria produced by Checklist Generators on a plurality of occasions during a simulation.

First, after a first system state, such as an early Health State in a Parallel Network, changes to a second state, the simulator generates a final report on performance of Criteria related to the first state.

Second, after a user discontinues an Intervention associated with at least one Criterion, the simulator generates a final report on performance of the Criteria.

Third, when a user-selected Query result generates at least one Criterion, after the virtual patient's age exceeds one of the latest age in the Criterion and a time specified with the result, the simulator generates a final report on performance of the Criteria.

Additionally, when a user or the simulator concludes a simulation for any reason, the simulator generates final reports on performance of all Criteria that have not been evaluated. The reports may be organized by Plan.

Reusability of Plans

The Master Plan structure may comprise a plurality of subordinate Plan objects. This design allows a knowledge acquisition effort to build a collection of reusable subordinate Plan objects. For instance, many drugs are excreted by the kidneys, have an effect on renal function, or alter the renal excretion of another compound. Similar considerations regarding the liver are relevant to other drugs. The rationale for checking renal or liver function is unique to the drug, but most of the processes for checking renal and liver function are common to many drugs. Therefore, the design advantageously provides a unique Explanation, associated with the Master Plan, for each drug or drug class, while providing one or more reusable Plan objects to describe the Actions required to check and follow renal function, and still other Plans to check and follow liver function. Subordinate Plan objects may also comprise an Explanation and further subordinate Plans.

Evaluator Rationale and Process

The foregoing description details a system and method for generating lists of Criteria before and during the user interaction with a simulator through a presentation system. In some situations, it is advantageous for the Checklist Generator to generate a non-exhaustive list of Criteria. For instance, ignoring an unusual Criterion may simplify the structure of the Checklist Generator and improve the user's understanding of the feedback provided. Nevertheless, the Criterion may deserve evaluation when it does occur. Furthermore, a Criterion may be desirable in some management plans but undesirable in others. The desirability of such a Criterion may be unclassifiable until the user specifies a large portion of the management plan.

The Evaluator attribute of a Plan, including a Master Plan and a Task Plan, is an inference program that accepts a plurality of virtual system characteristics as input data. In one exemplary embodiment of the invention, the Evaluator is a Bayesian network wherein at least one of a Relational Condition and a User Action defines the states of input Bayesian nodes. The Action is equivalent to a Criterion, but may be generated on demand when the simulator solves the Evaluator program, rather than being necessarily pregenerated by a Checklist Generator. A User Action in the knowledge base may represent both an output Criterion from a Checklist Generator and an input Criterion in an Evaluator simultaneously.

An Evaluator implemented as a Bayesian network can represent a variety of mathematical calculations, stochastic processes, and text concatenations simultaneously. Although an Evaluator is defined in the knowledge base, it can execute arbitrarily complex calculations and logic, much like any programming language. Consequently, the Evaluator can execute complex reasoning related to virtual patient characteristics, as described by Conditions, and User Actions. The simulator uses at least one of a Relational Condition and a Criterion to define the state of an input Bayesian node, and selects the first state in each node where the virtual patient has a matching node state.

Every Evaluator inference program identified by a Master Plan relevant to a complex system must execute at some time. A designer may elect to execute the Evaluator inference programs when an event causes the Master Plan to cease to be relevant to the complex system. A Master Plan identified by a system state ceases to be relevant in the event that the system state ends. A Master Plan identified by an intervention ceases to be relevant in the event that the intervention ends. All unprocessed Evaluator inference programs identified by a Master Plan relevant to a complex system must execute in the event that a simulation concludes.

Computer Adaptive Testing and Dynamic Simulation

The evaluation techniques of the invention can be combined with computer adaptive testing techniques to create a computer adaptive simulation testing system. In a computer adaptive simulation testing system, a user might first manage a moderately challenging complex system simulation. If management meets a performance threshold defined by Criteria from a Checklist Generator, or by the output of an Evaluator, then the user might manage a simulation of a system portraying very complex problems. If the user manages this simulation successfully, the test may conclude. Users who manage the first simulation unsuccessfully may next manage simulations of simpler problems, to determine whether they meet a minimum level of competence. Advantageously, a computer adaptive simulation testing system may shorten the average duration of the user interactions with the system, compared to a non-adaptive simulation system.

Mid-Simulation Feedback for Instruction

The evaluation techniques of the invention can produce feedback in the midst of a simulation. In one embodiment of mid simulation feedback, the user may request at least one of a Checklist Generator report and an Evaluator report during the simulation. In another embodiment of mid simulation feedback, the user may receive at least one of a Checklist Generator report and an Evaluator report when an event would initiate execution of an Evaluator. Feedback during a simulation allows the user to respond to errors of omission and end errors of commission interactively. Advantageously, this interactive correction of errors in a dynamic simulation may enrich the user's learning experience.

Combining Evaluation Results

A designer may need to combine the results of multiple processes that evaluate a user. The designer may wish to assign a plurality of weights to different plans. In addition, different users may invoke different numbers of plans, for instance by selecting different interventions, so that the simulator completes a different number of evaluations for two users working on the same initial simulation scenario.

The user's score on a single Checklist Generator can be defined by the sum of scoring weights of the desirable Criteria minus the sum of the undesirable Criteria. In one implementation, the user's score on a plurality of Checklist Generators is defined by the same formula applied to all Criteria, regardless of source. In another implementation, each Checklist Generator has a distinct score. The score of an Evaluator is defined as a result of the inference process. In one exemplary implementation, the score of an Evaluator implemented as a Bayesian network is defined by the numeric value of a node in the network. A continuously valued node in such a network may use a mathematical formula to combine Evaluator inputs with any desired weighting or contingencies. Thus, both Checklist Generators and Evaluators generate a numeric value based on user's performance, and define a maximum possible score for that component of the assessment process.

The designer may apply a simple administrative rule to all evaluative processes. In one exemplary implementation, the designer requires that a user acquire at least a threshold proportion of the maximum possible score on every Checklist Generator and Evaluator.

The designer may implement a distinct and arbitrarily complex combination rule for each complex system simulation. In an exemplary implementation, a complex system definition in the knowledge base links to an inference program for summarizing scores on Plans. Using at least one of a Checklist Generator score and an Evaluator score as input values, the inference program generates an overall score. In this implementation, a default value represents scores from any missing Plans, such as Plans linked to optional Interventions. The default value allows the inference program to distinguish between missing Plans and scores of zero. The inference program may combine a plurality of scores in any manner inherently supported by the inference process. The inference program may produce a final score and an explanation of the combination process.

Prior art teaches that the designer may classify user performance on more than one assessment theme. For instance, the American Board of Family Medicine scores family physician's knowledge in a plurality of specialty domains. Designers may define assessment themes that pertain to a broad range of system states. In a medical simulation, system states include topics such as hypertension and diabetes; an assessment theme called "internal medicine" might comprise these and other states. A non-exhaustive list of additional assessment themes in medicine includes 1) explaining symptoms; 2) treating symptoms; 3) stabilizing critical patients; 4) exploring patient beliefs; 5) anticipating complications; 6) looking for commonly concurrent system states; and 7) patient education. The designer may associate a theme with a plan, inference program, criterion, or evaluator output. The designer may then describe physician performance on a plurality of distinct themes at the conclusion of a single patient simulation exercise.

One embodiment of the invention allows the designer to associate physician performance related to an assessment theme with a retesting interval for that theme. A retesting interval is the time between tests on the same assessment theme. When a user demonstrates mastery of an assessment theme, that content may be ignored for an extended period of time. When a user demonstrates ignorance of an assessment theme, the user should be tested again on that content, after a brief interval of time to study. Users who have mastered many dimensions of content spend the minimum amount of time taking tests, because they have the longest possible retesting intervals. Users who have not mastered any dimensions of content will more rapidly repeat testing until mastery is demonstrated, or until the user elects to discontinue testing. The designer can require a user with intermediate mastery of an assessment theme to repeat testing in an intermediate time frame. In an extreme implementation of this testing strategy, an organization may have no pass/fail threshold of performance. Unqualified users could spend most of their time in testing and studying until they qualify for a long enough retesting interval to actually perform in real life the tasks portrayed on the test. There is no need for retesting related to one theme to be coupled to retesting for any other theme.

For example, a complex system may portray two system states, A and B, but not state C. State A is associated with a single Plan A1 pertaining to state A management. This plan generates user performance descriptions of "Fail", "Pass," and "Perfect" at the conclusion of a simulation. The designer may combine any number of such descriptions to arrive at a categorical Pass/Fail decision.

State B is associated with a Master Plan having two subordinate Plans, B1 and B2. Plan B1 is another state management Plan, but it classifies user performance as "Poor," "Good," and "Ideal." Each level of user performance is associated with a retesting interval: Poor performance requires retesting in 3 months, Good performance in 2 years, and ideal performance in 5 years. Better performance is rewarded with longer retesting intervals. Plan B2 pertains to an exemplary assessment theme called "Communication," which is distinct from state B management. Plan B2 again rewards better performance with longer retesting intervals, but now at 3 years for Poor performance, and 10 years for Ideal. Performance assessed by Plan B1 may be unrelated to performance assessed by Plans A1 and B2.

State C may be associated with a single Plan C1 that assesses the communication theme without assessing state management. A user who requires retesting on the communication theme before requiring retesting on state B management may be assigned a State C simulation.

An assessment theme may have variable importance between users. For instance, in a medical domain, patient communication themes may be less important if the user consistently adopts strategies that minimize the need for communication. A single step treatment completed in a physician's presence requires less communication skill than a multi-step treatment completed by the patient at home. Similarly, excellent performance on a first assessment theme may reduce the need to perform well on a second assessment theme. In one embodiment of the invention, an equation combines performance descriptions from a plurality of assessment themes to produce a summary performance description. In another embodiment of the invention, an inference program combines performance descriptions from a plurality of assessment themes to produce a summary performance description. In yet another embodiment of the invention, at least one inference program combines results from a plurality of assessment themes to generate a final performance description for each theme.

In a typical embodiment of the invention, final performance descriptions are classified as passing or failing. Different classification categories are permitted as needed by the designer. Optionally, each performance description may be associated with a retesting time interval for the associated assessment theme.

FIG. 1 is a block diagram in accordance with the system and method of the present invention. FIG. 1 details the evaluation process set forth below:

Master Plans are associated with five entities in a knowledge base for simulating a complex system:
1. Patient (or other complex system),
2. Health State (or other system state),
3. Intervention,
4. Query, and
5. Query Result.

Checklist Generator—The simulator generates an evaluative checklist report by the following steps in the virtual patient example of a complex system.

1. The simulator generates a virtual patient portraying at least one presenting Health State. The generation of the patient includes a plurality of patient data, such as relationships between the patient and other entities in the model, or enumeration of patient attributes. Typically, data from a knowledge base supports the patient generation process.

2. The simulator optionally instantiates an inference program for at least one Checklist Generator associated with one of a Master Plan or subordinate Plan associated with one of the patient or Health State description in the knowledge base.

3. The inference engine reads patient data, such as data generated in step 1, from the virtual patient as input data to the Checklist Generator. The Health State or Patient which identified the Master Plan may imply an input patient characteristic.

4. The inference engine generates at least one Criterion responsive to at least one combination of the input data. The simulator places the Criterion in the virtual patient's list of Potential Actions. Each Criterion comprises at least one of a feedback message for completion and a feedback message for omission.

5. The user interacts with the presentation system to perform at least one of selecting a Query, recording a Problem, selecting an Intervention, and arranging a Disposition for the virtual patient. The simulator records all such interactions as User Actions associated with the virtual patient. Each User Action is compared to the Criteria list. The status of a Criterion changes from "incomplete" to "complete" if a comparable User Action occurs within the Criterion time frame.

6. The simulator interprets user-selected Queries to generate Query results. At least one of the Query and the Query result may optionally be associated with a new Master Plan for the inference engine to process as in steps 2, 3 and 4. Optionally, the Master Plan further specifies a time interval after which the inference engine should produce a final report of Criteria status, as in step 10.

7. The inference engine processes any new Master Plan associated with a user-selected Intervention as in steps 2, 3, and 4.

8. During the simulation, the virtual patient may evolve from any one of a plurality of the presenting Health States to one of a plurality of new Health States, for instance during a Disposition. Health State evolution may cause the inference engine to:
 a. Compile a final report of Criteria, as in step 10, related to the presenting Health State's Master Plan and subordinate Plans, and
 b. Generate a new checklist of Criteria related to the new Health State's Master Plan and subordinate Plans, as in steps 2, 3, and 4.

9. The user may terminate an Intervention, causing the inference engine to compile a final report of Criteria, as in step 10, related to the Intervention's Master Plan and subordinate Plans.

10. The inference engine arranges Criteria related to a Master Plan's Checklist Generator by desirability status (comprising at least "desirable" and "undesirable" status) and completion (comprising at least "complete" and "incomplete"). In one exemplary implementation, an XML-tagged string arranges Criteria feedback into groups of desirable and completed, desirable and incomplete, undesirable and complete, undesirable and incomplete. Optionally, these groups define cells in a two-by-two table, a format familiar to some user groups. FIG. 5 illustrates a two by two table.

Evaluator

The simulator generates an evaluative complex report by the following steps in the virtual patient example of a complex system.

1. The simulator generates a virtual patient portraying at least one presenting Health State, as described for a Checklist Generator.

2. The simulator optionally instantiates an inference program for at least one Evaluator associated with one of a Master Plan or subordinate Plan associated with one of the patient or Health State description in the knowledge base. The Evaluator is placed on a list of pending Evaluators related to the virtual patient.

3. The user interacts with the presentation system to perform at least one of selecting a Query, recording a Problem, selecting an Intervention, and arranging a Disposition for the virtual patient. The simulator records all such interactions as User Actions associated with the virtual patient.

4. The simulator interprets user-selected Queries to generate Query results, which may be associated with a new Master Plan. The Master Plan or a subordinate Plan optionally identifies at least one Evaluator to instantiate as in step 2. Optionally, one of the Query result and the Master Plan further specifies a time interval after which the inference engine analyzes the Evaluator to produce a final complex report, as in step 8.

5. The simulator may identify a new Master Plan associated with a user-selected Intervention. The Master Plan or a subordinate Plan optionally identifies at least one Evaluator to instantiate as in step 2. Optionally, the Master Plan further specifies a time interval after which the inference engine analyzes the Evaluator to produce a final complex report, as in step 8.

6. During the simulation, the virtual patient may evolve from any one of a plurality of the presenting Health States to one of a plurality of new Health States, for instance during a Disposition.
 a. Health State evolution ends the relevance of any Evaluators associated with the presenting Health State's Master Plan and subordinate Plans. The inference engine analyzes the Evaluator to produce a final complex report, as in step 8.
 b. The simulator may identify a new Master Plan associated with the new Health State. The Master Plan or a subordinate Plan optionally identifies at least one Evaluator to instantiate as in step 2.

7. The user may terminate an Intervention associated with a Master Plan or subordinate Plans which identify at least one Evaluator. The inference engine analyzes the Evaluator to produce a final complex report, as in step 8.

8. The inference engine analyzes an Evaluator to produce a final complex report as follows:

a. Move the Evaluator from a list of pending Evaluators to a list of ready Evaluators. Following steps b-e may occur immediately, advantageously facilitating the analysis and providing immediate feedback. Alternatively, steps b-e may occur after a delay, advantageously allowing the analysis to occur when computer processing demand is low.

b. Read patient data, such as data generated in step 1, from the virtual patient as input data to match Conditions specified in the Evaluator. The sequence of objects identifying the Evaluator may imply an input patient characteristic.

c. Read at least one User Action, such as data generated in step 3, from the virtual patient as input data to match Criteria specified in the Evaluator.

d. Generate at least one conclusion regarding user performance from the Evaluator.

e. Produce as output at least one summary report for review by at least one of the user, the test administrator, and an administrative body requiring test results. The report may be tagged with XML descriptors.

Figure 2:
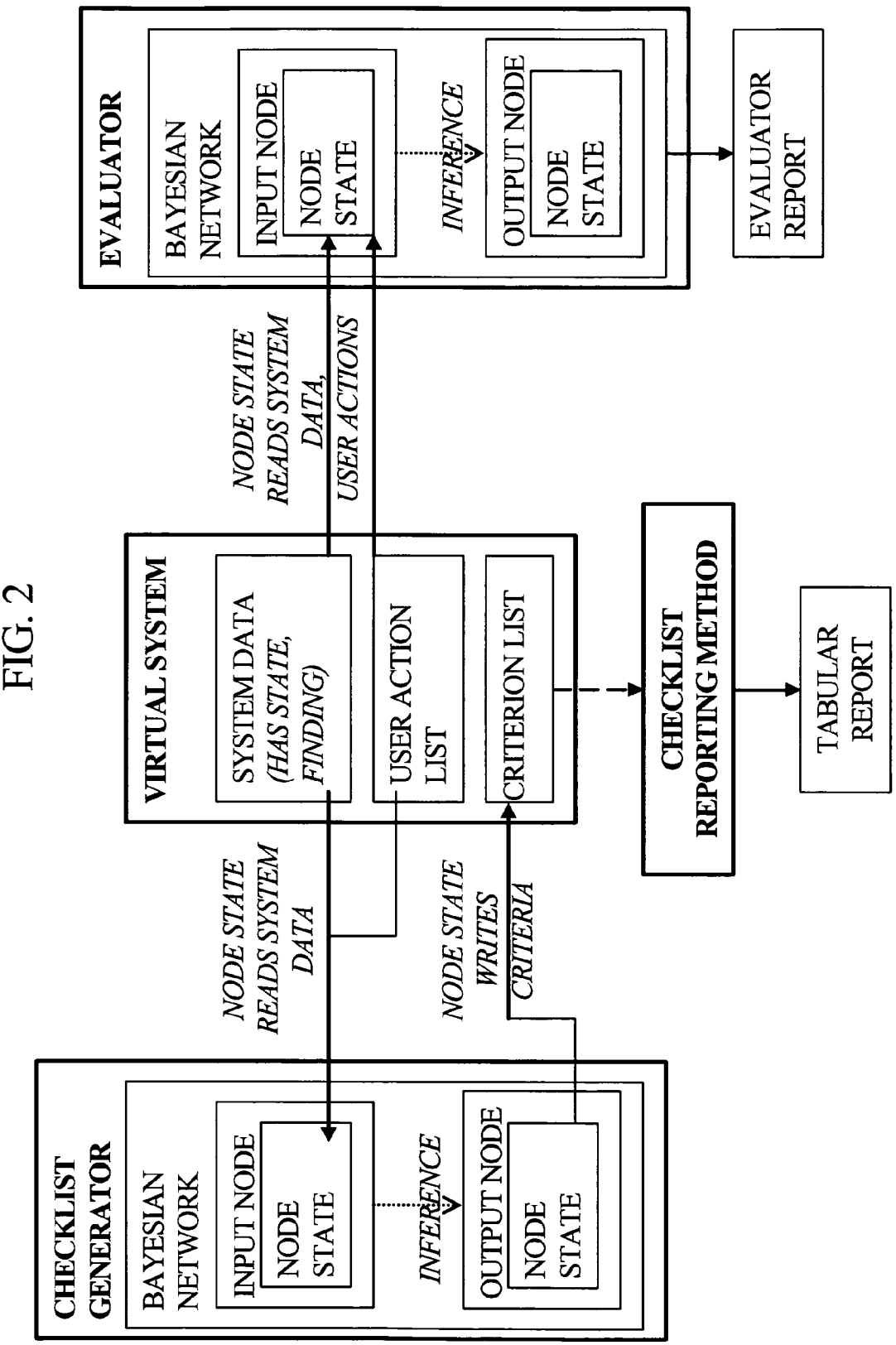
FIG. 2 is a block diagram showing the interaction between a Plan and a virtual patient in accordance with one embodiment of the present invention.

FIG. 2 is a block diagram showing the interaction between a Plan and a virtual patient (center of diagram) in accordance with one embodiment of the present invention. Plans comprise at least one of a Checklist Generator (left side of diagram) and an Evaluator (right side of diagram) and a subordinate Plan (not shown).

The Checklist Generator reads information from the patient, possibly but usually not including User Actions, makes an inference, and writes Criteria back to the patient. A checklist reporting method in the simulator produces a report contrasting User Actions and Criteria, for instance using a two by two table, without using a more robust inference program. The checklist reporting method and Checklist Generator are a complete evaluation system.

The Evaluator reads patient information, especially including User Actions, but also including biological data as needed, makes inferences, and writes a report as output. The Evaluator is a distinct, complete and arbitrarily complex evaluation system.

Figure 3:
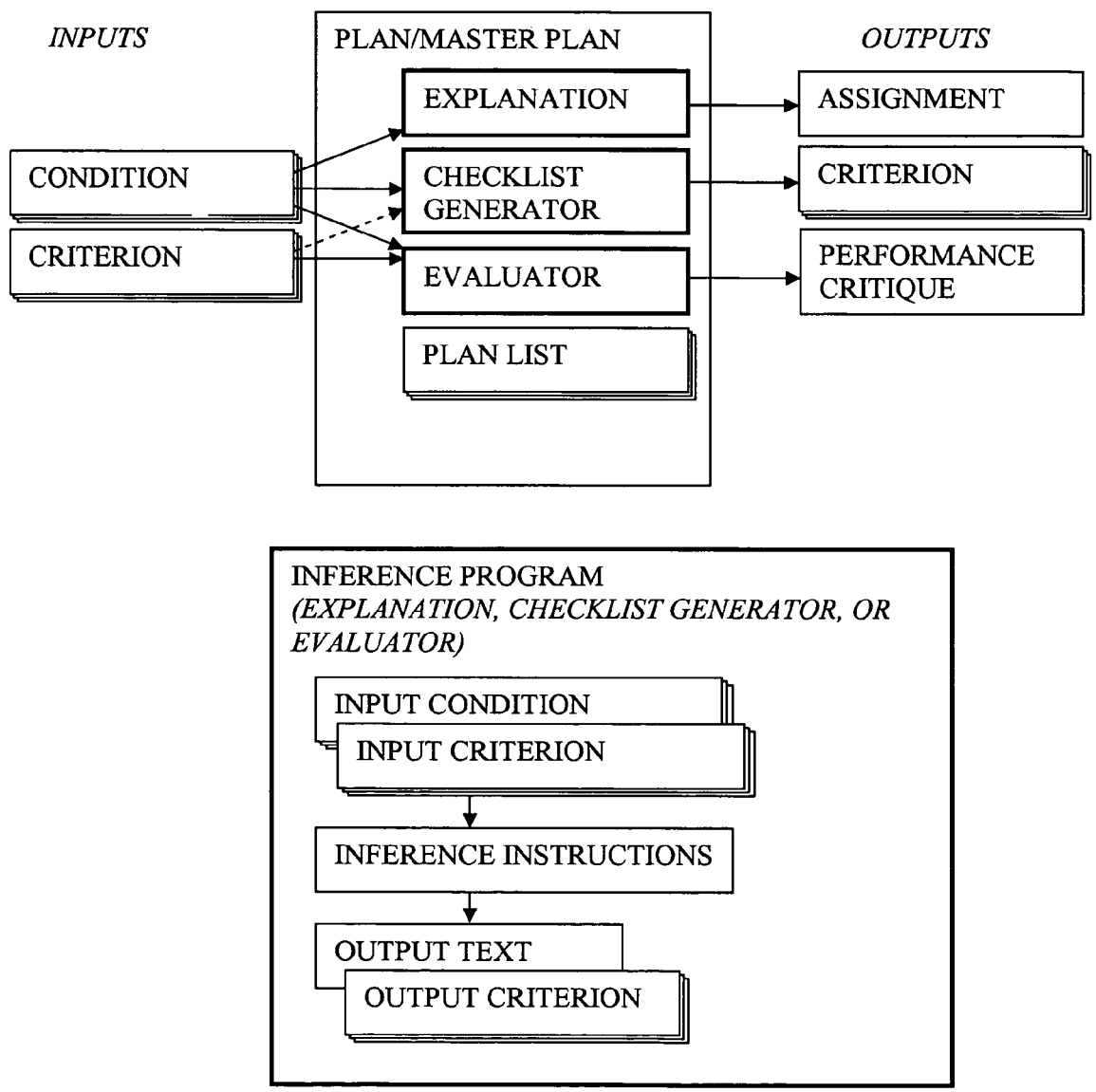
FIG. 3 illustrates Plan and Master Plan inputs, outputs, and general structure.

FIG. 3 illustrates Plan and Master Plan inputs, outputs, and general structure. A Master Plan is a Plan identified by another object type. All other Plans are subordinate to a Master Plan or Plan in a tree structure defined by Plan List links. A Plan comprises at least one of an Explanation, Checklist Generator, Evaluator, or Plan List. The Explanation, Checklist Generator, and Evaluator are Inference Programs.

An Inference Program takes input data from Conditions and Criteria, makes inferences from these input data, and produces as output at least one of a block of text and at least one Criterion.

FIG. 4A/4B is a table enumerating the major events related to evaluation. Each event is linked to knowledge base structures and simulator methods found in an exemplary medical embodiment of the invention. The figure compliments FIGS. 1 and 2 by illustrating the typical time sequence for events in both checklist management and arbitrarily complex evaluation. The Checklist Generator methods instantiate Criteria when an event begins, as when a simulation begins, a complex system state begins, a Query begins, and an Intervention begins, and when a Query response is returned. The Criterion checklist report is assembled when the event ends. The Evaluator is not processed at all until an event ends.

FIG. 5 illustrates an exemplary generic feedback format for a Master Plan in accordance with one embodiment of the invention. The heading identifies the user and the status of the evaluation. For each Master Plan, there is an Explanation and a table classifying Criteria generated by the Master Plan. The Explanation can provide much of the context for reviewing the table, so that the Action descriptors in the table are more generic, and therefore more easily reused.

Figure 6:
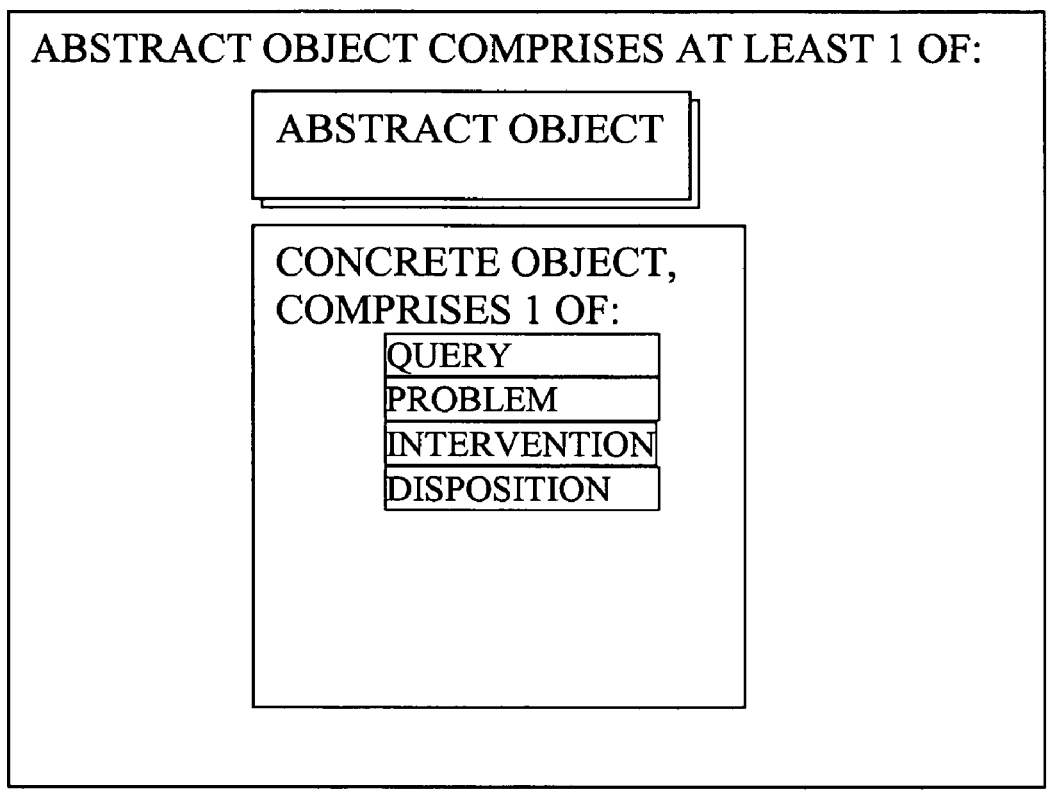
FIG. 6 illustrates abstract definitions of User Actions.

FIG. 6 illustrates abstract definitions of User Actions. A User Action is an Abstract Object. The Abstract Object comprises at least one of a list of at least one Abstract Object and a list of at least one Concrete Object. A Concrete Object is one of a Query, Problem (Diagnosis), Intervention, and a Disposition. No series of Abstract Object links should create a cycle; series of Abstract Object links should define tree structures terminating in Concrete Objects.

Figure 7:
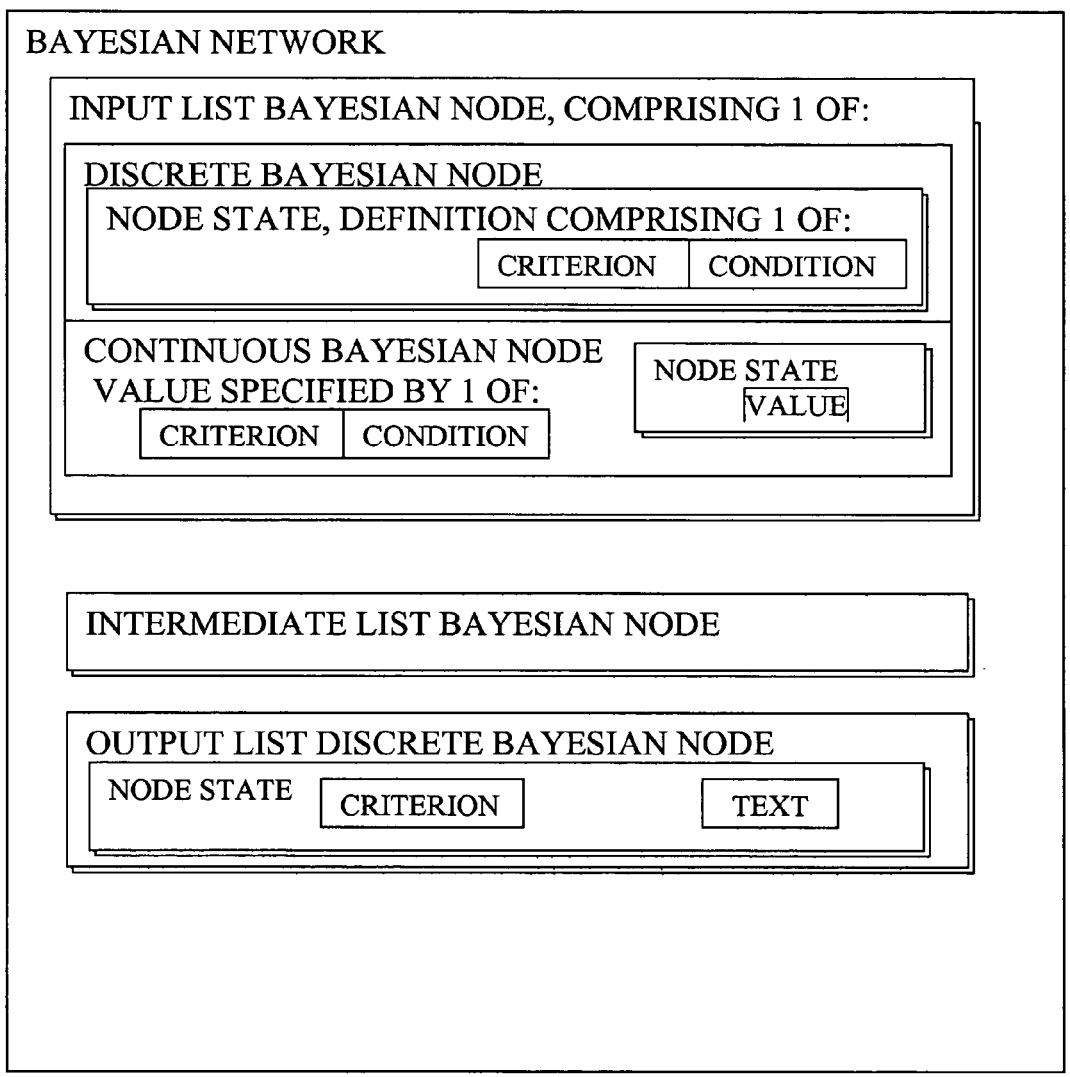
FIG. 7 illustrates the implementation of an inference program as a Bayesian network.

FIG. 7 illustrates the implementation of an inference program as a Bayesian network. The Bayesian Network optionally comprises a list of input nodes. The simulator sets the state of input nodes to reflect features of the virtual complex system simulation or data from an administrative database. A discrete input node is defined by a Condition describing the complex system or a Criterion that may be fulfilled by a User Action. A continuous input node has a dynamically assigned numeric value. Each state of a continuous Bayesian Node comprises upper and lower value limits. The value is defined by one of a Condition (e.g. a complex system value) and a Criterion (e.g. a disposition time). The value determines the state of the node.

The simulator sets the states of discrete intermediate and output nodes by Bayesian inferences from the states of the input nodes. Continuous intermediate and output nodes comprise a formula for calculating a value based on at least one of the states and values of other nodes. At least one output node state in a Checklist Generator is associated with at least one Criterion. The simulator will associate the Criterion with a virtual complex system meeting the requirements implied by the Bayesian network. At least one output node state in an Evaluator is associated with at least one text string. The simulator will include the test string in a report produced for a user managing a virtual complex system.

Figure 8:
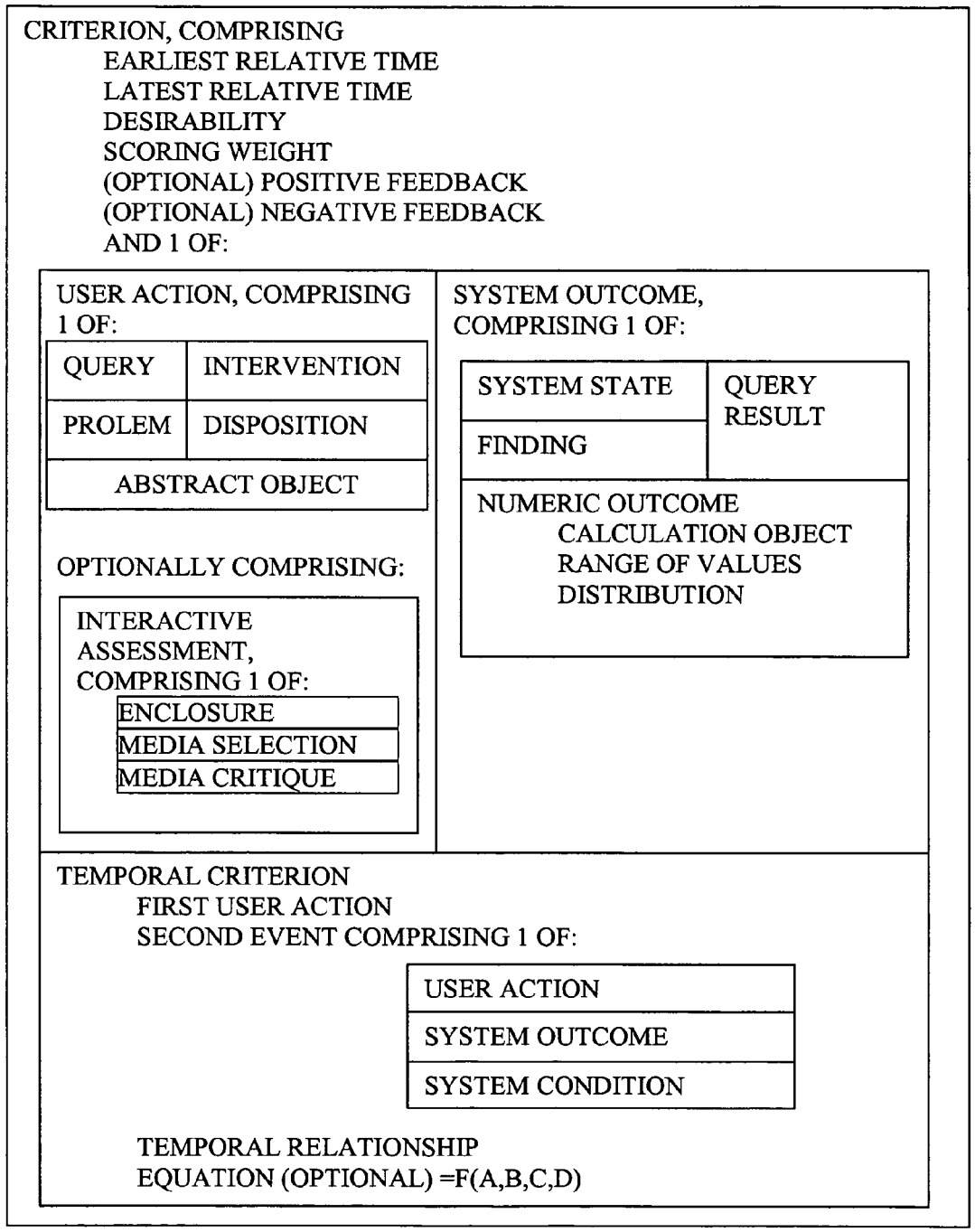
FIG. 8 illustrates the structure of a Criterion object.

FIG. 8 illustrates the structure of a Criterion object. In addition to shared attributes, a Criterion comprises one of a User Action, a System Outcome, and a Temporal Criterion. A User Action Criterion is fulfilled by a user's selections of Queries and Interventions, by inferred Problems, and by Disposition choices.

A User Action Criterion optionally comprises an Interactive Assessment object. Interactive Assessments probe a user's understanding of a User Action. An Interactive Assessment typically occurs when an Interactive Assessment Criterion output from a Checklist Generator matches a User Action.

A System Outcome identifies one of a System State, Finding, Query Result, and Numeric Outcome. A System Outcome Criterion is fulfilled when the virtual complex system produces the outcome.

A Temporal Criterion identifies a relationship between two events. One of the events is a first User Action. The second event is one of a second User Action, a System Outcome, and a System Condition. The Temporal Criterion is fulfilled when a user completes the first User Action in the correct time frame relative to the second event.

FIG. 9 illustrates three Interactive Assessment techniques. An enclosure task dynamically identifies an Ideal Boundary, consisting of one of a series of points and a mathematical formula. The Ideal Boundary typically covers or surrounds some defect. The user's task is to reproduce the boundary with a series of points meeting the degree of accuracy defined by the Overlap and Precision requirements. The Overlap requirement defines what fraction of the Ideal Boundary the user must enclose. The Precision requirement defines what portion of the user boundary may extend beyond the Ideal Boundary.

The Media Selection task comprises dynamically selected media and a dynamically generated stem. The user task is to select the best media.

The Media Critique task dynamically generates a stem and dynamically selects at least one Media Item. A Media Item comprises a picture, video, audio, or other media identifier. At least one Media Item further comprises an Observation associated with a value. The User task is to make Observations having positive value.

FIG. 10 enumerates the possible time relations between two events. The figure additionally defines three typical formulas to generate a continuous value from the endpoints of two events.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A computer implemented process for evaluating user interactions with a dynamic simulation of a system portraying at least one system state and responsive to user queries and interventions comprising the steps of:
   a) assigning a simulation to at least one user;
   b) using a computer to generate a simulated system comprising a system age and at least one system state affecting said system;
   c) using a computer to dynamically generate at least one criterion, said criterion associated with at least one of said system state, a query, a query result, and an intervention, when a change occurs in said at least one system state affecting said system by:
      i) identifying an inference program;
      ii) providing at least one input datum relating to said change in said at least one system state affecting said system, said at least one input datum defining the state of an input node in said inference program;
      iii) generating at least one criterion as an inference from said at least one input datum; said criterion comprising:
         a) a selected user activity to monitor, said activity comprising starting an intervention to improve the present or future state of the simulated system;
         b) a system age range in which to monitor said user activity, said age range comprising a start age and a stop age, wherein said start age is calculated by adding said system age to a relative start time, and said stop age is calculated by adding said system age to a relative stop time;
         c) a classification of said user activity as desirable or not desirable; and
         d) a weight value selected from a weight value set having at least one weight value;
   d) accepting at least one user action comprised of said selected user activity and an age of the simulated system when the selected user activity occurs;
   e) evaluating said at least one accepted user action to determine if at least one of said accepted user action and its consequences require generation of additional criterion and repeating steps c and d if additional criterion require generation;
   f) determining a status of said at least one criterion dynamically generated in step c; and,
   g) generating at least one performance description based on at least one of: desirable actions performed; undesirable actions avoided; desirable actions omitted, and undesirable actions committed.

2. The computer implemented process for evaluating user interactions of claim 1, wherein said at least one criterion dynamically generated in step c identifies an abstract monitored user activity representing a plurality of user activities that define actual user actions that the simulation accepts in step d.

3. The computer implemented process for evaluating user interactions of claim 1, where, after the step of generating at least one performance description, the process comprises the further step of: reporting said at least one performance description.

4. The computer implemented process for evaluating user interactions of claim 3, wherein the step of reporting said at least one performance description comprises the substeps of:
   a) obtaining a feedback phrase associated with the status of at least one criterion;
   b) generating a report summarizing at least one of: desirable actions performed; undesirable actions avoided; desirable actions omitted, and undesirable actions committed; and
   c) presenting said report.

5. The computer implemented process for evaluating user interactions of claim 4, where said at least one criterion dynamically generated includes a dynamically generated explanation, said dynamically generated explanation being a user-interpretable description of said at least one criterion and said dynamically generated explanation being included as a preamble to said generated report.

6. The computer implemented process for evaluating user interactions of claim 1, where said system age range is dynamically dependent on an association between said simulated system and with at least one of one said system state, a query, a query result, and an intervention.

7. The computer implemented process for evaluating user interactions of claim 1, where a dynamically generated criterion may further comprise a specification for presenting at least one direct question to said assigned user, said specification comprising a dynamically generated stem and at least one response.

8. The computer implemented process for evaluating user interactions of claim 1, where a dynamically generated criterion may further comprise a specification for presenting at least one direct question to said assigned user, said specification comprising:
   a) a stem comprised of a dynamically generated explanatory component and a dynamically generated media component;
   b) a dynamically generated boundary specification enclosing a portion of the dynamically generated media component;
   c) a first quantification identifying what portion of the boundary specification that the assigned user must include in a subsequently identified user boundary; and,
   d) a second quantification identifying what portion of said subsequently identified user boundary that the boundary specification must include.

9. The computer implemented process for evaluating user interactions of claim 8, where said step of determining a status classifies said dynamically generated criterion as met only where said first quantification is exceeded and where said second quantification is not exceeded and otherwise classifies said dynamically generated criterion as not met.

10. The computer implemented process for evaluating user interactions of claim 9, where said specification for presenting at least one direct question to said assigned user further comprises a first instruction to follow where said status is determined as met and a second instruction to follow where said status is determined as not met.

11. The computer implemented process for evaluating user interactions of claim 1, where a dynamically generated criterion may further comprise a specification for presenting at least one direct question to said assigned user, where said direct question requires said assigned user to select a media portrayal, said specification comprising:
 a) a dynamically generated stem; and,
 b) a plurality of media responses, each said media response comprising: dynamically generated media responsive to the system context and a numeric score.

12. The computer implemented process for evaluating user interactions of claim 1, where a dynamically generated criterion may further comprise a specification for presenting at least one direct question to said assigned user, where said direct question requires said assigned user to critique at least one media portrayal, said specification comprising:
 a) a dynamically generated stem;
 b) at least one media item, said media item comprising: dynamically generated media responsive to the system context and at least one observation including at least one identifying label and a value; and
 c) a scoring formula for combining values of observations to generate a score.

13. The computer implemented process of claim 1 further comprising dynamically generating at least one criterion when one of a system state, query, and intervention begins by:
 a) identifying an inference program;
 b) providing at least one input datum relating to said one of a system state, query, and intervention, said at least one input datum defining the state of an input node in said inference program;
 c) solving the inference program to generate at least one criterion as an inference from the at least one input datum.

14. The computer implemented process of claim 1, wherein determining a status of said at least one criterion in step f further comprises identifying said at least one criterion as fulfilled if:
 a) said at least one accepted user action is identical to or a descendent of said selected user activity; and
 b) said age of said simulated system when said selected user activity occurs is between said start age and said stop age.

* * * * *